United States Patent [19]

Frederick

[11] Patent Number: 5,768,126

[45] Date of Patent: Jun. 16, 1998

[54] KERNEL-BASED DIGITAL AUDIO MIXER

[75] Inventor: Ronald A. Frederick, Mountain View, Calif.

[73] Assignee: Xerox Corporation, Stamford, Conn.

[21] Appl. No.: 445,261

[22] Filed: May 19, 1995

[51] Int. Cl.$^6$ ................................................ H04B 1/20
[52] U.S. Cl. ............................ 364/400.01; 369/4
[58] Field of Search .................... 369/4, 3, 5, 2; 381/119, 58, 80, 81, 87, 88; 360/22, 24, 18; 364/514 R, 400.01

[56] References Cited

U.S. PATENT DOCUMENTS

| | | | |
|---|---|---|---|
| 4,969,385 | 11/1990 | Williams et al. | 89/656 |
| 5,283,638 | 2/1994 | Engberg et al. | 348/14 |
| 5,444,676 | 8/1995 | Balsamo et al. | 369/4 |
| 5,541,354 | 7/1996 | Farrett et al. | 84/603 |

OTHER PUBLICATIONS

Silicon Graphics, Inc. Irix Operating System, Release 5.3 (Nov. 1994): MAN pages for audio (on–line help file). [Note–cover sheet is photocopy of the CD–Rom containing Irix 5.3 software.]
Silicon Graphics, Inc. Media Tools User's Guide, chapter 6. (Nov. '1994).
Digital Equipment Corp. ① Audio File (AF) Release Notes and Installation Instructions; and ② version 3, release 1 update for same.
Sun Microsystems Sun Operating System, Release 4.1: MAN pages for audio, audioamd, Streamio (on–line help files).
Yamaha Corp. ① Brochure for Pro Mix 01 (audio mixer); and ② press release for same (Apr. 9, 1995).
NeXT Computer, Inc. Release notes for Release 3.2. (1993).
Gateway 2000 Sound Blaster 16 User Guide, Cover and front matter, Chapter 2, Chapter 5, and Chapter 9.
Inside MacIntosh by Apple Computer, Inc., Addison–Wesley Publishing Company, pp. iii –xix, 1–1 –1–34, 2–1 –289, 3–1–3–17, 5–1 –5–21.

*Primary Examiner*—Douglas W. Olms
*Assistant Examiner*—Ajit Patel

[57] ABSTRACT

A system and method are disclosed for mixing multiple digital audio streams originating from or destined for multiple tasks in a computer system. In one aspect, a method is carried out in a computer system having a processor. The processor executes a multitasking operating system that has a kernel, executes a first task under control of the operating system, and while executing the first task executes a second task under control of the operating system. First and second audio streams are provided, each made up of a series of digital audio samples representing an audio signal and affiliated, respectively, with the first and second tasks. By executing a portion of the operating system kernel with the processor, the first and second audio streams are mixed to provide a mixed audio stream made up of a series of digital audio samples representing a superposition of the first and second audio signals.

28 Claims, 10 Drawing Sheets

KERNEL-BASED DIGITAL AUDIO MIXER

BACKGROUND OF THE INVENTION

The invention relates to digital audio processing in computer systems and more specifically to the simultaneous provision of digital audio for multiple tasks in a multitasking computer system.

Many computer systems, and in particular many workstations and personal computers, provide digital audio capability. These computer systems can be used to input, process, and output sound. A workstation, for example, is likely to have among its inputs a microphone coupled to an analog-to-digital converter (ADC) and to have among its outputs an digital-to-analog converter (DAC) coupled to a speaker, as well as to have software for processing streams of digital audio samples originating from the ADC and destined ultimately for the DAC. The same software or similar software can be used to process streams of digital audio samples originating from or destined for a data storage medium, such as a hard disk or CD-ROM, or a computer network, such as a local-area or wide-area network. These "virtual" audio devices can take the place of the ADC or DAC as sources and sinks of digital audio samples.

A workstation's digital audio capability can be made accessible to various software tasks, such as user application programs for audio recording, processing, and playback, in any of various ways. In one approach, software tasks can access the audio capability by calling specialized audio routines provided in a software library. This approach is used, for example, in certain workstations manufactured by Silicon Graphics, Inc., Mountain View, Calif. In another approach, tasks can access the audio capability by reading from or writing to an audio device that appears to the task as a file of the workstation's file system. This approach is used, for example, in certain workstations manufactured by Sun Microsystems, Inc., Mountain View, Calif.

The approach of providing the audio capability as a device is of interest here. More specifically, the workstation's multitasking operating system, which can be, for example, a version of the well-known UNIX operating system, provides a logical device or pathname, called /dev/audio or another suitable name, that a task can open and close for read access, write access, or combined read/write access in the same manner as any UNIX file is opened and closed. Read access to the logical device /dev/audio allows the task to control physical hardware including a microphone-ADC combination, and thus to receive an audio signal from the microphone in the form of a stream of digital audio samples from the ADC. Write access to the logical device /dev/audio allows the task to control physical hardware including a DAC-speaker combination, and thus to produce an audio signal at the speaker by providing a stream of digital audio samples to the DAC.

Unfortunately, as implemented conventionally the logical-device approach is limited. In particular, whenever one task accesses /dev/audio, all other tasks are prohibited from doing so. Thus two or more tasks cannot receive sound input from the microphone at the same time or supply sound output to the speaker at the same time. A better way to handle the processing of digital audio from multiple tasks is needed.

SUMMARY OF THE INVENTION

The invention provides a system and method for mixing multiple digital audio streams originating from or destined for multiple tasks in a computer system. In one aspect, the invention provides a method carried out in a computer system having a processor. The processor executes a multitasking operating system that has a kernel, executes a first task under control of the operating system, and while executing the first task executes a second task under control of the operating system. First and second audio streams are provided, each made up of a series of digital audio samples representing an audio signal and affiliated, respectively, with the first and second tasks. By executing a portion of the operating system kernel with the processor, the first and second audio streams are mixed to provide a mixed audio stream made up of a series of digital audio samples representing a superposition of the first and second audio signals.

In another aspect, the invention provides a method, carried out in a computer system having a processor, in which the processor executes a multitasking operating system having a kernel. The kernel provides a mixing capability for mixing a plurality of component audio streams into a mixed audio stream. Each component audio stream can be made up of a series of digital audio samples representing a component audio signal, and the mixed audio stream is made up of a series of digital audio samples representing a superposition of the component audio signals. Under control of the operating system, the processor executes a task that is affiliated with an audio stream made up of a series of digital audio samples representing some audio signal. A connection is established between the audio stream affiliated with the task and the mixing capability of the kernel, by designating the audio stream affiliated with the task as a component audio stream to be mixed into the mixed audio stream. With the connection between the audio stream affiliated with the task and the mixing capability of the kernel thus established, the processor executes a portion of the kernel to effect the mixing capability and thus to mix the audio stream affiliated with the task into the mixed audio stream. With the audio stream affiliated with the task thus mixed into the mixed audio stream, the mixed audio stream is provided as an output from the mixing capability. The output can be provided following the establishment of the connection with a latency of no more than 30 milliseconds, so that in general the length of the delay between the introduction of a new audio signal as a component and the emergence of that component in the audible mixed output is not objectionable to typical human listeners.

The invention will be better understood with reference to the drawings and detailed description below. In the drawings, like reference numerals indicate like components.

DETAILED DESCRIPTION

The invention introduces a set of one or more audio mixers into the kernel of the multitasking operating system of a computer system. To the application program executing under control of the operating system, the set of audio mixers appears identical to the standard /dev/audio logical audio device. The task can read from /dev/audio to receive a stream of digital audio samples from a mixer and can write to /dev/audio to supply a stream of digital audio samples to a mixer, just as though the task were reading from or writing to the standard /dev/audio. Transparently to the task, however, other tasks can also have read and write access to the set of mixers, and multiple audio streams can be combined to produce a superposition of the audio signals represented by the streams' digital samples. A queuing mechanism mediates between the tasks and the mixers, and between the mixers and output, to ensure an uninterrupted flow of audio samples and a near-real-time response to changes in audio signals or mixer controls such as gain (level) controls and routings.

Because the mixers' presence is transparent to application programs, existing application programs can be run using the mixers without having to be rewritten, recompiled, or relinked. Nevertheless, multi-stream audio functionality is achieved.

A specific embodiment that will now be described has been implemented on a Sun Microsystems SPARCSTATION workstation in a UNIX-based operating system called SUNOS 4.1.3, also known as SOLARIS 1.1, modified to include software to support the invention. The logical audio device is called /dev/audio. Logical devices are represented and interconnected using the AT&T System V UNIX STREAMS interface, which is provided as part of the Sun SOLARIS UNIX environment. Digital audio is encoded as companding 8-bit mu-law audio samples (the same sample encoding used by ISDN voice circuits for telephony) that are processed at an 8 kHz sample rate. The total bit rate supported is 64 kilobits per second. It will be appreciated that these values are illustrative, and that other values can be used consistent with the hardware capabilities of particular embodiments.

System Hardware and Software

Figure 1:
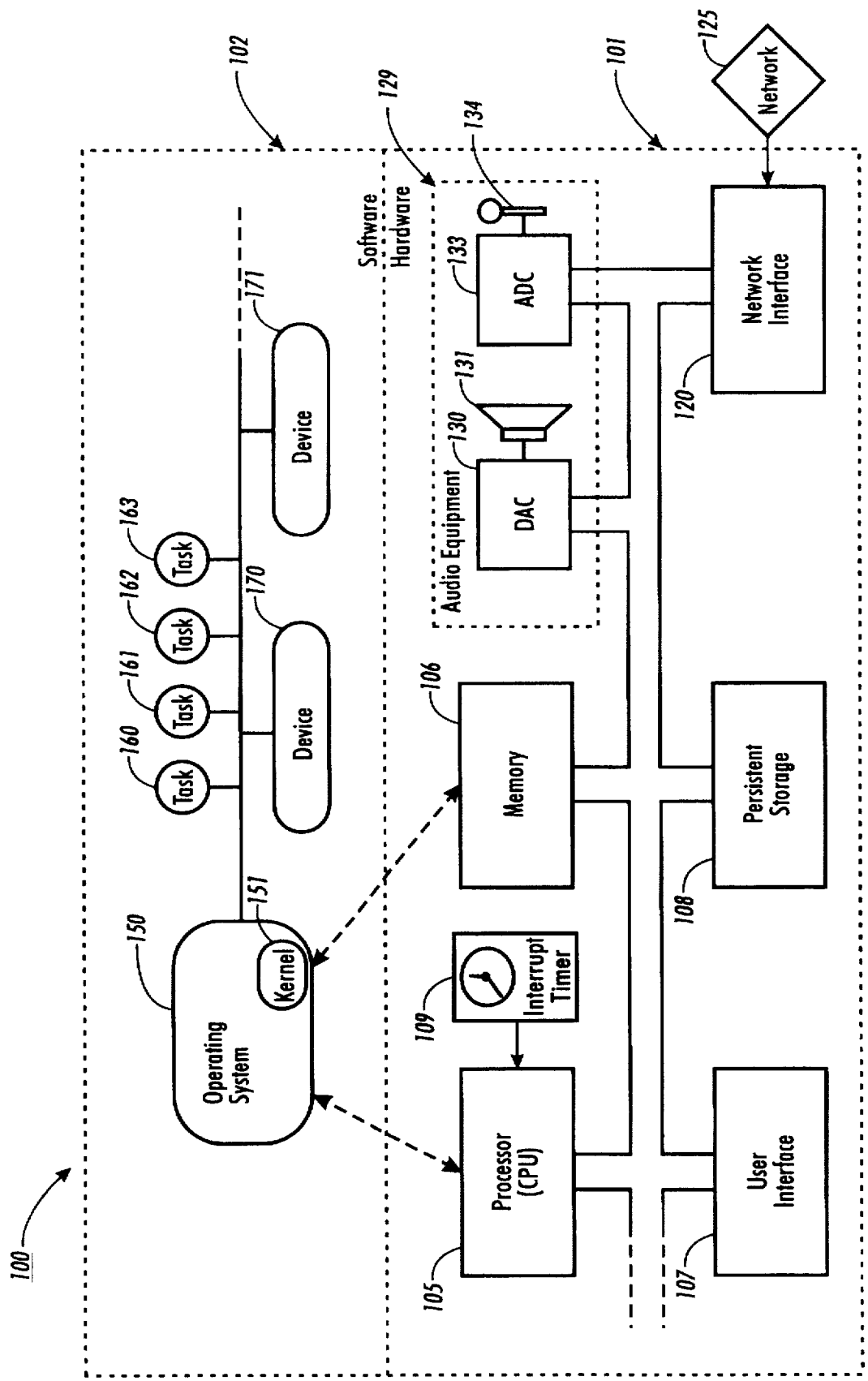
FIG. 1 schematically depicts a computer system suitable to an embodiment of the invention.

FIG. 1 schematically depicts a computer system 100 suitable to an embodiment of the system and method of the invention. Computer system 100 can be, for example, a workstation, personal computer, or other single-user or multi-user computer system. For purposes of exposition, computer system 100 can be conveniently divided into hardware components 101 and software components 102; however, persons of skill in the art will appreciate that this division is conceptual and somewhat arbitrary, and that the line between hardware and software is not a hard and fast one.

Hardware components 101 include a processor (CPU) 105, memory 106, user interface hardware 107, persistent storage 108, and audio equipment 129, which includes a digital-to-analog converter (DAC) 130 coupled to a speaker 131 and an analog-to-digital converter (ADC) 133 coupled to a microphone 134, along with support circuitry, such as sample-and-hold and amplifier circuitry (not shown). These components are linked by a bus 110 or other suitable interface. Processor 105 is coupled to an interrupt timer 109. Also shown in FIG. 1 is a computer network 125, which is not part of computer system 100 but to which computer system 100 can optionally be coupled via a network interface 120 in some embodiments.

Processor 105 can be, for example, a microprocessor or a collection of microprocessors. Memory 106 can include read-only memory (ROM), random-access memory (RAM), virtual memory, or other memory technologies, singly or in combination. User interface hardware 107 typically includes a visual display monitor such as a cathode-ray tube (CRT) or flat-panel display, an alphanumeric keyboard, and a mouse or other pointing device, and optionally can further include a printer, an optical scanner, or other devices for user input and output apart from audio equipment 129. Persistent storage 108 can include, for example, a magnetic hard disk, a floppy disk, a compact disc (CD-ROM or other CD format), or other persistent data storage technologies, singly or in combination. Interrupt timer 109 can be incorporated directly into the circuitry of processor 105, or can be implemented with separate timing circuitry. It provides processor 105 with periodic interrupts, for example, every ten (10) milliseconds. Network 125 can be a local-area network (LAN) or wide-area network (WAN), and network interface 120 includes hardware, such as local-area network connection circuitry or a modem, by which computer system 100 and, more specifically, processor 105 can communicate with network 125.

Audio equipment 129 includes hardware used to provide computer system 100 with audio input signals and to provide audio output signals from computer system 100. It also includes hardware for converting audio signals to and from the digital domain so that they can be processed by processor 105. Audio equipment 129 can be built into computer system 100 as standard equipment or can be added on as peripheral equipment. In some embodiments, audio equipment 129 can include two or more microphone-ADC combinations to provide stereo input, or two or more speaker-DAC combinations to provide stereo output. In other embodiments, the input or output of audio signals can be done in the digital domain, thus bypassing the need for DAC 130 or ADC 133. For example, audio equipment 129 can incorporate a digital audio tape (DAT) unit with a direct-to-digital recording and playback capability.

The presence of audio equipment 129 in computer system 100 allows computer system 100 to be used for interactive real-time audio processing, for example, in recording, playback, and digital editing and processing of user-input sounds, speech, and music. In some embodiments, audio signals to be processed according to the invention are supplied from real-time or non-real-time sources other than or in addition to audio equipment 129. In particular, audio can be input from and output to network 125 via network interface 120, or can be input from a portion of persistent storage 108 (for example, from a CD-ROM) and output to another portion of persistent storage 108 (for example, audio recording tape). In yet other embodiments, processor 105 can synthesize a digital audio signal that can, for example, be output to audio equipment 129 (specifically, to DAC 130 and speaker 131), to persistent storage 108, or to network 125 via network interface 120.

Software components 102 include a multitasking operating system 150 having a kernel 151, a set of tasks under control of operating system 150, such as tasks 160, 161, 162, and 163, and logical devices or pathnames under control of operating system 150, such as devices 170, 171. Processor 105 executes the software of operating system 150 and its tasks in conjunction with memory 106 and other components of computer system 100. Operating system 150 can be, for example, a version of the well-known UNIX operating system (originally developed by AT&T Bell Laboratories, Murray Hill, N.J. and now available from a number of different vendors). The tasks can be application programs. The logical devices can represent files of the file system or physical or virtual hardware devices, in particular audio equipment 129 and network interface 120, that operating system 150 treats as being logically equivalent to files. For example, operating system 150 can allow a task, such as any of tasks 160, 161, 162, or 163, to access logical devices such as devices 170, 171 and to open, close, read from, or write to these logical devices whether the logical devices represent files stored in persistent storage 108 or represent physical hardware such as audio equipment 129 or network interface 120.

Operating system 150 provides two or more levels at which processor 105 execute software. Kernel 151 runs at a level called the kernel level, and user tasks, such as tasks 160, 161, 162, or 163, typically run at a level called the user or application level. At the kernel level, kernel 151 has complete and direct access to all resources of system 100, including all hardware components 101, all logical devices, such as devices 170, 171, and all portions of memory 106. Also, kernel 151 is responsible for handling hardware interrupts and for scheduling user tasks, such as any of tasks 160, 161, 162, or 163, to run. At the user level, user tasks typically run with only limited access to system resources, and kernel 151 mediates the tasks' ability to access and to share those resources.

Periodic interrupts received by processor 105 from timer 109 can cause a transfer of control from tasks to interrupt service procedures in kernel 151, in particular, to procedures for servicing mixers and mixer input and output queues in kernel 151 according to the invention. Timer 109 can be set to generate the periodic interrupts every ten milliseconds, for example. Operating system 150 provides software timing services whereby a process can be scheduled to run at one or more specified timer interrupts. If the periodic timer interrupts are thought of as analogous to the ticks of an alarm clock, operating system 150 provides a mechanism or set or mechanisms whereby the alarm can be set to go off at any given tick of the clock, thus triggering one or more designated procedures to be run on that tick. In particular, a procedure for servicing a mixer and that mixer's associated input and output queues can be caused to run upon the occurrence of the next timer interrupt, the next one after that, or in general the Nth next timer interrupt where N is a positive integer of a size that can be conveniently represented in a unit of memory 106, such as 16-bit or 32-bit integer.

Persons of skill in the art will appreciate that the present invention can be practiced in a wide variety of computer systems and hardware and software configurations, not limited to the system depicted in FIG. 1.

Mixers

According to the invention, operating system 150 provides access to one or more audio mixers, which are implemented in software as part of kernel 151. Each mixer can combine two or more digital audio input signals into a single digital audio output signal, which can be routed to one or more destinations. The input signals each represent a sound wave, and the output signal represents a sound wave that is a superposition of the sound waves represented by the input signals. Typically, the superposition is achieved through a linear combination of the component sound waves with limiting, such as clipping, when the resultant mixed wave exceeds a predetermined maximum amplitude threshold.

Each mixer has data and control inputs and outputs. The data inputs receive digital audio input signals. The data outputs provide digital audio output signals produced by mixing the input signals. The control inputs receive control information, including control values or parameters that allow the gain or relative amplitude of each input signal to be independently controlled, the gain or relative amplitude of each output signal routing to be independently controlled, the sizes of buffers and queues to be controlled, and the silence-filling feature (to be discussed below in conjunction with FIG. 7C) to be turned on and off. The control outputs provide control information and average signal level outputs to tasks for monitoring purposes. For example, a task can use the control outputs to monitor the current settings of gain control values.

The digital input and output audio signals processed by a mixer are streams, or time series, of digital audio samples. These signals are characterized by an encoding scheme and a sample rate as is well-known in the art. For example, a 13-bit mu-law sample encoding with an 8 kHz sample rate can be used. As another example, a 16-bit linear sample encoding with a 44.1 kHz sample rate (the same rate as for audio compact discs) can be used. In other embodiments, still other encoding schemes and sample rates can be used, consistent with the processing power provided by processor 105.

Figure 2:
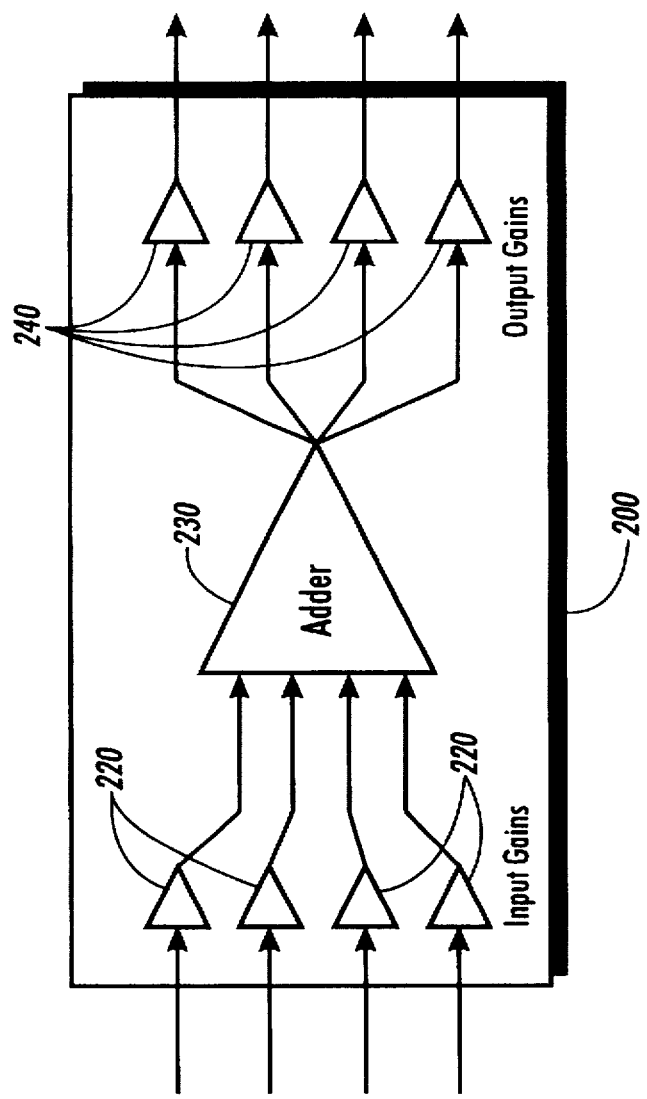
FIG. 2 is a view of a mixer, showing data channels and gain controls.

FIG. 2 illustrates a mixer 200. Mixer 200 receives digital audio input signals whose amplitudes are added by adder 230 to produce a single mixed output signal that can be routed to one or more destinations. Input gain controls 220 allow the relative amplitude of each input signal to be controlled with respect to the amplitude of the mixed output signal. Output gain controls 240 allow the amplitude of the mixed output signal to be controlled independently with respect to different routing destinations. (For simplicity, control inputs and outputs are not shown in FIG. 2.)

A digital input or output audio signal can be routed between a mixer (such as mixer 200) and a task, physical hardware, or another mixer. Communication between a mixer and a task takes place at the user level. From the task's viewpoint, the task accesses the mixer through a logical device provided by operating system 150, which the task can control by invoking appropriate procedures provided by operating system 150. For example, the task can open and close the logical mixer device and can read data from the device or write data to it while it is open. As will be explained in more detail below with reference to FIG. 3, mixers are provided in pairs, so that a single logical mixer device suffices for both reading and writing digital signals. The task can also access a separate logical device to communicate with the mixer's control inputs.

Direct communication between a mixer and hardware 101 of computer system 100, and in particular, with audio equipment 129, network interface 120, or persistent storage 108, takes place at the kernel level. Direct communication from one mixer to another (cascading of mixers) also takes place at the kernel level. Direct communication between a mixer and hardware or between two mixers can be established by a task. The task opens the logical device representing the mixer, opens the logical device representing the physical hardware, and invokes a special procedure of operating system 150 to link the two logical devices. The link can be made temporary, in which case it lasts only so long as the task continues to execute, or can be made permanent, in which case it endures even after the task terminates. More particularly, under the Sun SOLARIS operating system, the task calls the operating system routine ioctl(file_descriptor1, I_LINK, file_descriptor2) to effect a temporary link between the logical devices described by the file descriptor values file_descriptor1 and file_descriptor2, or calls ioctl(file_descriptor1, I_PLINK, file_descriptor2) to effect a permanent link between the logical devices described by the file descriptor values file_descriptor1 and file_descriptor2. The file descriptor values are provided to the task when the task opens the respective logical devices. (To sever an established link, a task can call ioctl(file_descriptor1, I_UNLINK, file_descriptor2) if the link is temporary or ioctl(file_descriptor1, I_PUNLINK, file_descriptor2) if the link is permanent.)

Once a permanent link between a mixer and hardware or between two mixers is established, the digital signals flow according to the link regardless of whether any tasks are active or are using the signals. For example, if a permanent link is established between a mixer and audio equipment 129 at system initialization time, the mixer will constantly be "listening in" on audio input from microphone 134 and constantly providing audio output to speaker 131 of any signals with which the mixer is provided. In particular, two or more tasks can play back two or more streams of audio data to the mixer simultaneously, and the mixer will mix these streams to produce a single combined digital output that is converted to an analog audio signal by DAC 130 and subsequently is heard at speaker 131. Thus two or more tasks can share DAC 130 and speaker 131 even though the DAC-speaker combination is represented by only one logical device and that logical device, but for the presence of the mixer, cannot be shared by multiple tasks. This use of the mixer for sharing an audio device will be discussed further below in connection with the example of FIGS. 4A–4B.

Mixer Pair Architecture

Figure 3:
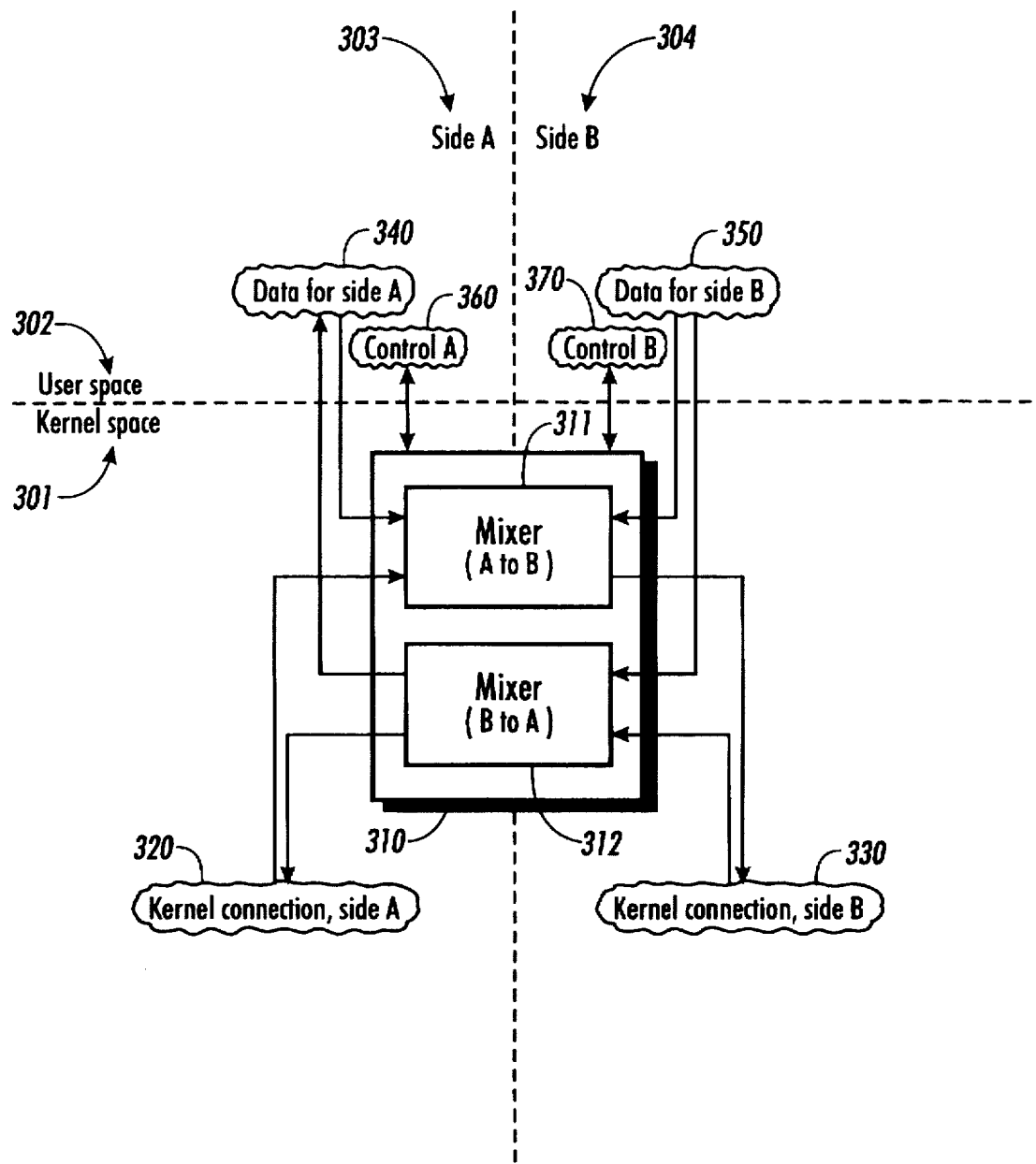
FIG. 3 schematically depicts the architecture of a pair of mixers.

In a preferred embodiment, mixers are grouped in pairs as illustrated in FIG. 3. A mixer pair can serve simultaneously as both a source and a sink of audio data, and thus facilitates bidirectional access by tasks or hardware. For example, a task can access a mixer pair as a single logical device that can be opened both for reading and writing (e.g., record and playback). If mixers were not paired, a task intended to both read and write audio data would have to open two separate logical devices corresponding to two mixers, one for reading and one for writing. As another example, audio equipment 129, which can be represented as a single logical device, can be permanently linked to a mixer pair represented as another single logical device, so that the mixer can receive audio input from microphone 134 via ADC 133 and can simultaneously provide audio output to speaker 131 via DAC 130.

Referring now to FIG. 3, mixer pair 310 incorporates two mixers 311, 312 in a structure that can be described as providing four sets of bidirectional audio data channels and two sets of bidirectional control channels. Sets of audio data channels or control channels can be represented as pathnames or logical devices provided by operating system 150. Logical devices can be accessed by tasks executing at the user level or can be coupled directly to other logical devices at the kernel level. Each of the data channels represented by a logical device is called a tap. Taps will be described more fully below.

Also as will be described more fully below, a task can provide an audio signal to be input to a mixer pair, can receive an audio signal output by a mixer pair, or both. The task can invoke operating system procedures through which the task can open the mixer pair as a logical device and can write sample data to the mixer pair, thus providing an audio input signal to the mixer pair, and additionally or alternatively can read sample data from the mixer pair, thus receiving an audio output signal from the mixer pair. In a UNIX operating system, the data is written or read in the same manner as it would be written or read for any other logical device, such as a disk file.

In FIG. 3, two of the four sets of data channels provided by mixer pair 310 are labeled side A 303 of the mixer pair and the remaining two are labeled side B 304 of the mixer pair. Mixer 311 mixes audio inputs received from side A 303 and delivers mixed audio outputs to side B 304. Mixer 312 mixes audio inputs received from side B 304 and delivers mixed audio outputs to side A 303.

On each side (A or B) of mixer pair 310, one set of data channels is controlled by kernel 151 and is available for interconnections between mixer pair 310 and physical hardware or other mixer pairs, and the other set of data channels is available for interconnections between mixer pair 310 and tasks, such as application programs. Because kernel 151 executes at the kernel level of privilege and tasks execute at the user level of privilege, links between mixer pair 310 and physical hardware or other mixer pairs are said to exist in a kernel space 301 and links between mixer pair 310 and tasks are said to exist in a user space 302. The connections of mixer pair 310 located in kernel space 301 are independent of particular tasks and are controlled directly by kernel 151. The connections of mixer pair 310 located in user space 302 are affiliated with particular tasks and are controlled by those tasks through calls to appropriate procedures provided by operating system 150.

To summarize, the four sets of data channels can be thought of as serving four conceptually distinct spaces of operation: side A 303 of kernel space 301, side B 304 of kernel space 301, side A 303 of user space 302, and side B 304 of user space 302. The two sets of control channels can be thought of as serving two conceptually distinct spaces of operation: side A 303 of user space 302, and side B 304 of user space 302.

In the operation of mixer pair 310, audio data 320 from side A 303 of kernel space 301 can be supplied to the input of mixer 311 and received from the output of mixer 312. Audio data 340 from side A 303 of user space 302 can be supplied to the input of mixer 311 and received from the output of mixer 312. Audio data 330 from side B 304 of kernel space 301 can be supplied to the input of mixer 312 and received from the output of mixer 311. Audio data 350 from side B 304 of user space 302 can be supplied to the input of mixer 312 and received from the output of mixer 311. Control information 360 can be supplied to and received from side A 303 of user space 302 and, for example, can pertain to the input gain values for mixer 311 and the output gain values for mixer 312. Control information 370 can be supplied to and received from side B 304 of user space 302 and, for example, can pertain to the input gain values for mixer 312 and the output gain values for mixer 311.

Sets of data channels or control channels can be represented by operating system 150 as logical devices. For example, if there are N mixer pairs in system 100, where N is a positive integer, for values of j from 0 to N−1 the jth mixer pair can be associated with four logical devices, which in a UNIX operating system can be called /dev/mixerj_a, /dev/mixerj_b, /dev/mixerj_a_ctl, and /dev/mixerj_b_ctl. Thus mixer pair 0 has devices /dev/mixer0_a, /dev/mixer0_b, /dev/mixer0_a_ctl, and /dev/mixer0_b_ctl associated with it; mixer 1 has devices /dev/mixer1_a, /dev/mixer1_b, /dev/mixer1_a_ctl, and /dev/mixer1_b_ctl associated with it; and so forth. The devices /dev/mixerj_a and /dev/mixerj_b respectively provide access to the A-side and B-side audio data channels of the jth mixer pair. The devices /dev/mixerj__a__ctl, and /dev/mixerj__b__ctl respectively provide access to the A-side and B-side control channels of the jth mixer pair.

For example, suppose that mixer pair 310 is taken to be mixer pair 3 in system 100. In this case, logical device /dev/mixer3__a provides a data connection to side A 303 of mixer pair 310, and logical device /dev/mixer3__b provides a data connection to side B 304 of mixer pair 310. Thus a task that opens /dev/mixer3__a and thereafter writes a stream of audio data to /dev/mixer3__a causes that stream to be supplied to the input of mixer 311 and therefore to contribute to the mixed output stream of mixer 311, which appears on side B 304 and can be received, for example, by a task that opens and reads from the logical device /dev/mixer3__b. Conversely, a task that opens /dev/mixer3__b and thereafter writes a stream of audio data to /dev/mixer3__b causes that stream to be supplied to the input of mixer 312 and therefore to contribute to the mixed output stream of mixer 312, which appears on side A 303 and can be received, for example, by a task that opens and reads from /dev/mixer3__a.

Also, mixer pair 310 additionally or alternatively can be coupled to a task that can control or monitor the gains associated with side A 303 or side B 304. To control the gains on side A 303 (that is, the input gains of mixer 311 and the output gains of mixer 312), the task opens and writes to /dev/mixer3__a__ctl. To monitor these gains, the task reads from /dev/mixer3__a__ctl. To control the gains on side B 304 (that is, the input gains of mixer 312 and the output gains of mixer 311), the task opens and writes to /dev/mixer3__b__ctl. To monitor these gains, the task reads from /dev/mixer3__b__ctl.

Besides being coupled in user space 302 to a task or tasks, mixer pair 310 additionally or alternatively can be coupled in kernel space 301 to a physical or virtual hardware device or devices or to another mixer pair or pairs. For example, a permanent bidirectional link can be established between /dev/mixer3__a and the logical device, here called /dev/audio, that represents audio equipment 129. This link causes a stream of digital audio samples from ADC 133, representing the analog audio signal produced by microphone 134, to be delivered as input to mixer 311 and further causes the mixed output stream of mixer 312 to be delivered to DAC 130, which converts it to an analog audio signal that is made audible through speaker 131.

A data connection between a mixer pair and a task, a hardware device, or another mixer pair is called a tap. A tap can be thought of as an access point to the mixer pair. A tap is inherently bidirectional, in that a task or other entity can both read from and write to the mixer pair via the tap.

Unidirectional access can be achieved by opening the tap for read-only or write-only access. A single logical device can support multiple taps. For example, the device /dev/mixer3__a can be opened by several different tasks simultaneously. Each such task has a separate tap to mixer pair 310, and can contribute an input to and receive output from the A side 303 of mixer pair 310 (that is, can supply an input stream to mixer 311 and receive a mixed output stream from mixer 312).

In this embodiment, there are eight mixer pairs numbered 0 through 7, each supporting a maximum of 30 taps. The 30 taps can be allocated arbitrarily among the four sets of data channels of the mixer pair. For example, for mixer pair 301, taps can be allocated in kernel space 301 or user space 302 and on side A 303 or side B 304, in any combination so long as the total number of taps does not exceed 30. A tap is allocated when a task opens the logical device representing the tap, and deallocated when a task closes the logical device. For example, again taking mixer pair 310 to be mixer pair 3 of system 100, a task that opens /dev/mixer3__a causes a tap to be allocated on side A 303 of mixer pair 310 in user space 302, and a task that opens /dev/mixer3__b causes a tap to be allocated on side B 304 of mixer pair 310 in user space 302. As another example, a task that establishes a permanent link between /dev/mixer3__a and another logical device, such as /dev/audio, causes a tap to be allocated on side A 303 of mixer pair 310 in kernel space 301.

Because multiple taps can be open at once in user and in kernel space, audio streams from various tasks, hardware devices, and mixer pairs can be input to the same side of a given mixer pair at the same time and thus can be mixed together. Also, the mixed output from either side of the mixer pair can be simultaneously routed to tasks, hardware devices, and other mixers.

Each mixer pair has two control channels in this embodiment. One control channel per mixer pair can be used to control side A of the mixer pair and one can be used to control side B of the mixer pair. Control channels are accessed from user space in this embodiment. For example, again taking mixer pair 310 to be mixer pair 3 of system 100, a task that opens /dev/mixer3__a__ctl accesses the control channel for side A 303 of mixer pair 310 in user space 302, and a task that opens /dev/mixer3__b__ctl accesses the control channel for side B 304 of mixer pair 310 in user space 302. A control channel can be shared by two or more tasks. For example, if two tasks both open /dev/mixer3__a__ctl at the same time, both tasks can send control signals to and receive control signals from side A 303 of mixer pair 310.

In this embodiment, the taps and control channels of the various mixer pairs are mapped to logical devices according to a mapping scheme that will now be described. Each logical device in operating system 150 has a unique 16-bit identifier, whose upper 8 bits are called the major number of the device and whose lower 8 bits are called the minor number of the device. The major number indicates the type of device and the procedures to be called for opening, closing, reading from, writing to, and controlling the device. The minor number is furnished as an argument to these procedures when they are called.

According to the mapping scheme, all mixer pairs share a single, otherwise-unused major number, which is taken to be major number 124 in this embodiment. (It will be appreciated that the choice of major number 124 has been made here in order to make the exposition that follows more concrete, and that another otherwise-unused major number could just as well have been chosen instead.) Each of the 8 mixer pairs is allocated an equal share of the 256 available minor numbers associated with major number 124; thus each mixer pair has 32 minor numbers associated with it. Of these 32 minor numbers, the first two are reserved for control channels for the A and B sides of the mixer pair, respectively, and the remaining 30 are used to represent the 30 data taps of the mixer pair. Thus, logical devices are identified with control channels as follows:

| Logical Device | Major Number | Minor Number |
|---|---|---|
| /dev/mixer0__a__ctl | 124 | 0 |
| /dev/mixer0__b__ctl | 124 | 1 |
| /dev/mixer1__a__ctl | 124 | 32 |
| /dev/mixer1__b__ctl | 124 | 33 |
| ... | ... | ... | and similarly for the remaining six mixer pairs. For taps, minor numbers (and thus logical devices) are dynamically assigned when taps are newly opened for use and are released for reuse when taps are closed.

The dynamic assignment of minor numbers to taps is accomplished using a technique called cloning. Operating system 150 provides a flag called the clone flag and a clone device type, assigned major number 37 in this embodiment, that can be used in conjunction with the clone flag to provide dynamic assignment of minor numbers. Opening device (37, x) (that is, opening the logical device whose major number is 37 and whose minor number is x) has the effect of opening device (x, 0) with the clone flag set. This, in turn, opens the device whose major number is x and whose minor number is the first free minor number available for major number x.

Unfortunately, the standard cloning mechanism of operating system 150 is not adequate to support the dynamic assignment of taps on a per-side, permixer-pair basis. Opening device (37, 124) will result in the opening of (124, 0) with the clone flag set, which, in turn, will open the first free minor number for major number 124. The standard cloning mechanism does not provide a way to specify that a tap on a particular side of a particular mixer pair is to be opened.

To overcome the limitations of the standard cloning mechanism, in this embodiment a special mixer clone device type is defined and is assigned a major number equal to the mixer pairs' assigned major number plus 1. Thus, if the mixer pairs all have major number 124, the mixer clone device type has major number 125. Further, software is provided in operating system 150 so that opening device (125, 32n+d), where n is an integer from 0 through 7 and d is either 0 or 1, has the effect of assigning the first free minor number for mixer pair n to a tap on side A of mixer pair n if d=0 or side B of mixer pair n if d=1. For example, when device (125, 0) is first opened, the result is that the device (124,2) is assigned to a tap on side A of mixer pair 0. As another example, when device (125,33) is first opened, the device (124,34) is assigned to a tap on side B of mixer pair 1. With the mixer clone device thus defined, logical devices can be identified with taps as follows:

| Logical Device | Major Number | Minor Number |
| --- | --- | --- |
| /dev/mixer0_a | 125 | 0 |
| /dev/mixer0_b | 125 | 1 |
| /dev/mixer1_a | 125 | 32 |
| /dev/mixer1_b | 125 | 33 |
| . . . | . . . | . . . | and similarly for the remaining six mixer pairs.

A Mixer Pair Providing Shared Audio

Before the present invention, computer systems based on Sun workstations did not incorporate audio mixers in the operating system kernel. Application programs intended to perform digital audio functions in such known systems (hereinafter, "legacy audio programs") make reference to a single, unshared logical audio device or pathname, called /dev/audio, that is provided by the operating system and represents the audio equipment. A legacy audio program running as a task in such a known system can read from /dev/audio to receive audio input from the microphone via the ADC, and can write to /dev/audio to supply audio output to the speaker via the DAC. Unfortunately, the device /dev/audio is a single-user device that can be accessed by only one task at a time. Therefore in such known systems it is not possible to share the speaker or the microphone between two or more tasks running at the same time.

It is desirable that legacy audio programs can be used in conjunction with the present invention and, moreover, that multiple legacy application programs can be run contemporaneously, with their audio streams being mixed by the mixer pairs of the invention to effect a sharing of the logical audio device /dev/audio. For example, in computer system 100, it is desirable that two legacy audio programs, each running independently of the other, can supply their respective audio sample streams as output to DAC 130 and speaker 131, so that their sounds play together, and can receive the input sound stream supplied from ADC 133 and microphone 134. It will now be shown with reference to the example of FIGS. 4A–4B that this can be done without having to rewrite or recompile the legacy audio programs, even though these programs are not designed to work with a mixer and so make no reference to any mixer, but only to /dev/audio.

Figure 4A:
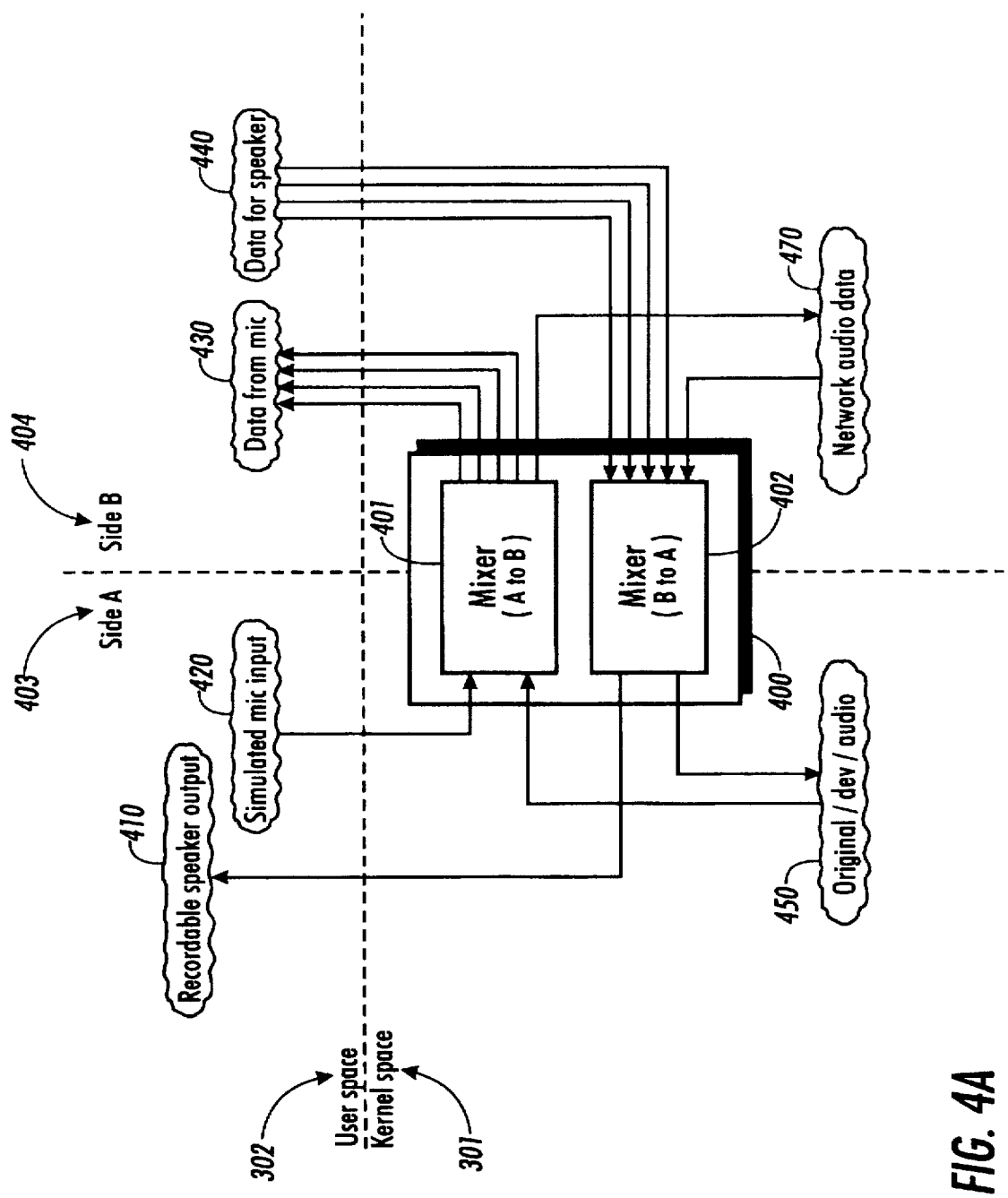
FIG. 4A schematically depicts an example of usage of a pair of mixers for shared audio.

Referring now to FIG. 4A, mixer pair 400 is taken to be mixer pair 0 (i.e., the zeroth mixer pair of the eight mixer pairs numbered 0 through 7) of system 100. Mixer pair 400 incorporates mixer 401 that mixes inputs from side A 403 and delivers mixed outputs to side B 404, and mixer 402 that mixes inputs from side B 404 and delivers mixed outputs to side A 403.

Eight taps of mixer pair 400 are used in this example. One tap provides a data connection to side A 403 of kernel space 301, one provides a data connection to side B 404 of kernel space 301, two provide data connections to side A 403 of user space 302, and four provide data connections to side B 404 of user space 302. The remaining 22 taps are not used in this example. (Control channel connections are not shown.)

The tap located on side A 403 in kernel space 301, which is associated with logical device /dev/mixer0_a, provides a permanent, bidirectional connection to audio equipment 129. This can be achieved, for example, by establishing a permanent link between /dev/mixer0_a and /dev/audio at system initialization, as will be explained more fully below with reference to FIG. 5. Audio data 450 to and from audio equipment 129 (that is, audio input signals received by microphone 134 and digitized by ADC 133 and audio output signals supplied to speaker 131 via DAC 130) are coupled to mixer pair 400 via this tap. Thus microphone 134 and speaker 131 are always "live" in this example.

Continuing in FIG. 4A, the four taps located on side B 404 in user space 302, all of which are associated with logical device /dev/mixer0_b, serve to connect four user tasks with mixer pair 400. Via these taps, the tasks can read mixed audio data 430 output by mixer 401 and can write audio data 440 as input to mixer 402. (It will be observed that additional tasks could be included here by using additional taps of mixer pair 400.)

The four taps effectively connect the four tasks to audio equipment 129. Audio signals detected by microphone 134 are digitized by ADC 133 to become audio data 450 that is fed into mixer 401 where it contributes to the mixed audio output data 430 that the tasks can read from logical device /dev/mixer0_b. Audio input data 440 that the tasks can write to logical device /dev/mixer0_b is fed to mixer 402 where it contributes to the output portion of audio data 450, which is converted by DAC 130 to an analog signal that is made audible by speaker 131.

If any or all of the four tasks are legacy audio programs, they can be connected to mixer pair 400 automatically upon attempting to access /dev/audio. Automatic connection to the mixer pair can be accomplished through certain system initialization procedures, explained more fully below with reference to FIG. 5, that cause all subsequent references to /dev/audio to be automatically redirected to /dev/mixer0_b. Thus legacy audio programs can transparently connect to mixer pair 400 without any need for program rewriting or recompilation, even though their software was designed without mixers in mind and makes no explicit reference to any mixer device.

Continuing in FIG. 4A, the taps located at side A 403 of user space 302, both of which are associated with logical device /dev/mixer0_a, provide a first task with access to audio data 410 that is output by mixer 402 and a second task with access to audio data 420 that is input to mixer 401. Audio data 410 echoes the output of the speaker 131; it is the same as the output portion of audio data 450, which is directed to DAC 130 and converted to an audio signal made audible by speaker 131. Audio data 420 serves as an input to mixer 401 in addition to the input provided by microphone 134 via ADC 133; it is "simulated microphone" input, supplied by a task in user space 302, that can be combined with the input portion of audio data 450, which is produced by ADC 133 in response to an audio signal received from microphone 134.

Although taps are inherently bidirectional, each tap located at side A 403 of user space 302 is used in one direction only in this example. Two taps, rather than just one, are needed here because the functions of echoing the output of speaker 131 and of providing simulated microphone input to supplement the live input from microphone 134 are assumed to be performed by two independent tasks. If echoing of the speaker output and provision of simulated microphone input are performed by a single task instead of by two separate tasks as in this example, then only one tap is needed at side A 403 of user space 302. (Although not shown in this example, it is also possible for a single task to require multiple taps, as when a single task opens both /dev/mixer0_a and /dev/mixer0_b, or where a single task provides both audio data and control information to mixer pair 400.) The tap located at side B 404 of kernel space 301, which is associated with logical device /dev/mixer0_b, provides a permanent connection to network interface 120 and thus to audio data transmitted to and received from network 125. The permanent connection can be achieved, for example, by establishing at system initialization a permanent link between /dev/mixer0_b and a logical device that represents the network audio. Audio data 470 to and from network interface 120 (that is, digital audio received from and supplied to network 125) are coupled to mixer pair 400 via this tap. Thus network audio is always active in this example; audio received from network 125 contributes via mixer 402 to the mixed output made audible at speaker 131, and the live input from microphone 134 and simulated microphone input supplied through the tap located at side A 403 in user space 302 are mixed by mixer 401 into a mixed output that is transmitted to network 125.

Figure 4B:
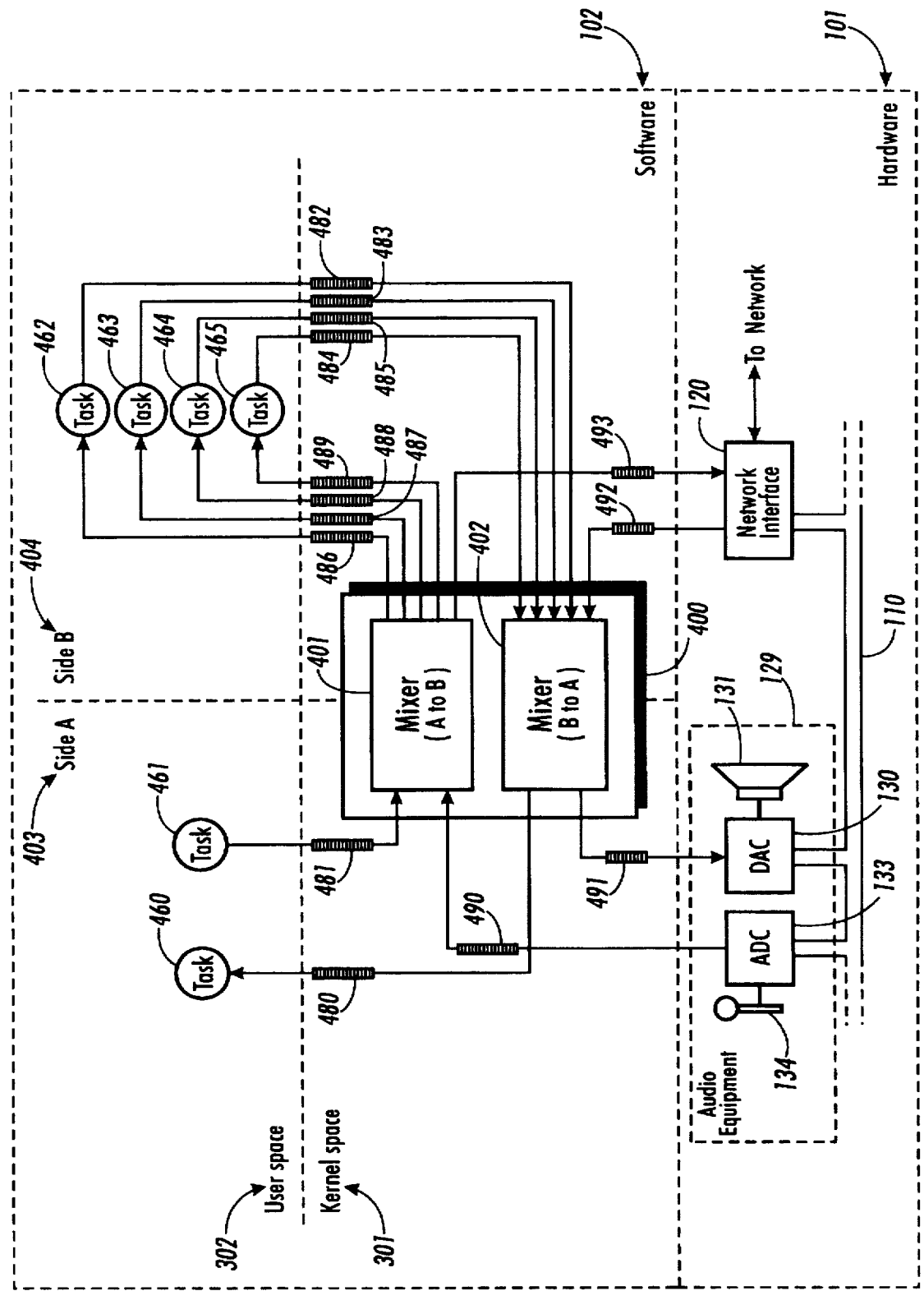
FIG. 4B depicts the example of FIG. 4A, and additionally shows input and output queuing, tasks for receiving and producing audio sample data streams, and a task for mixer control.

FIG. 4B shows the example of FIG. 4A in further detail. Tasks 462, 463, 464, and 465 connect with mixer pair 400 via the four taps on side B 404 in user space 302. Task 460, which echoes the output sent to speaker 131 via DAC 130, and task 461, which provides simulated microphone input to supplement the live input supplied by microphone 134 via ADC 133, connect with mixer pair 400 via the two taps on side A 403 in user space 302. Audio equipment 129 connects with mixer pair 400 via the tap on side A 403 in kernel space 301. Network interface 120 connects with mixer pair 400 via the tap on side B 404 in kernel space 301.

Connections between mixer pair 400 and the rest of system 100 are mediated by input queues 481, 482, 483, 484, 485, 490, and 492, and output queues 480, 486, 487, 488, 489, 491, and 493. In general, each tap of a mixer pair has its own individual input queue and output queue. Thus there can be up to 30 input queues and 30 output queues per mixer pair. Queues can be stored as data structures in memory 106. For example, a given queue can be stored in a contiguous region of memory or in several multiple linked regions of memory.

The queues serve to buffer digital samples input to and output from mixer pair 400 and, in particular, to allow multiple audio input streams to be synchronized, as will be described more fully below with reference to FIGS. 7A–7C. A queue should be wide enough to contain the samples with which it is supplied and deep (i.e., long) enough to provide the mixer pair with adequate buffering. In this embodiment, queue size can be up to on the order of 8 kilobytes, or about 1 second's worth of 8-bit audio samples at a sample rate of 8 kHz; typically for real-time audio usage, however, the output queue size is no more than 240 bytes, or 30 milliseconds' worth of 8-bit audio samples at 8 kHz. Output queue depth is implementation-dependent and can vary, for example, according to the sample rate and according to whether the particular output queue is expected to provide real-time or non-real-time audio data, as well as according to the available memory resources. In some embodiments, different mixer pairs of a system can support different sample rates and sample encoding schemes, so that queue depth and width can vary from one mixer pair to another within the same system. In some embodiments, queue depth can be adjusted by a user through a user interface, such as user interface 107.

In general, increasing the queue depth increases the latitude of the mixer pair to delay processing of real-time inputs, as when one or more input sample streams is for some reason delayed in reaching the mixer pair, but reduces the responsiveness of the mixer pair to new inputs, because there is a greater lag time between the introduction of a new input into the mix and the appearance of that input as a contribution to the mixed output. Conversely, decreasing the queue depth quickens the response of the mixer pair to new inputs, but reduces the flexibility with which the mixer pair can accommodate input delays and diminishes the time window over which the mixer pair can act to maintain the synchronization of its inputs.

Besides containing samples, input queues can also contain certain kinds of control information, also called markers. A marker can, for example, take the form of specially encoded data that the mixer software of kernel 151 recognizes as not being a sample. Alternatively, if queues are stored as linked multiple contiguous regions of memory 106, each new region can be preceded by a header byte or word, and this header byte or word can be used to indicate whether the data that follows it is to be treated as sample data or as marker data. A task can place a marker in the queue by calling an appropriate procedure of operating system 150, such as the UNIX ioctl procedure. A marker can be used, for example, to signal the mixer to take special action with regard to the input queue in which the marker appears, for example to suspend processing of subsequent samples from that input queue for a certain elapsed time interval (e.g., a certain number of microseconds) or until a predetermined time for resuming processing is reached. As another example, a task can place an end-of-block marker at the end of a particular block of audio data. When the mixer encounters the end-of-block marker, the mixer notifies the task that the end of the block has been encountered. In this way, the task can tell that a given set of enqueued samples has actually been mixed.

The mixer software of kernel 151 can dequeue samples and markers from the input queues and enqueue samples into the output queues. Tasks, hardware, and other mixer pairs can enqueue samples and markers into the input queues and dequeue samples from the output queues. The procedures for queue management will be further described below with reference to FIGS. 7A–7C.

Figure 5:
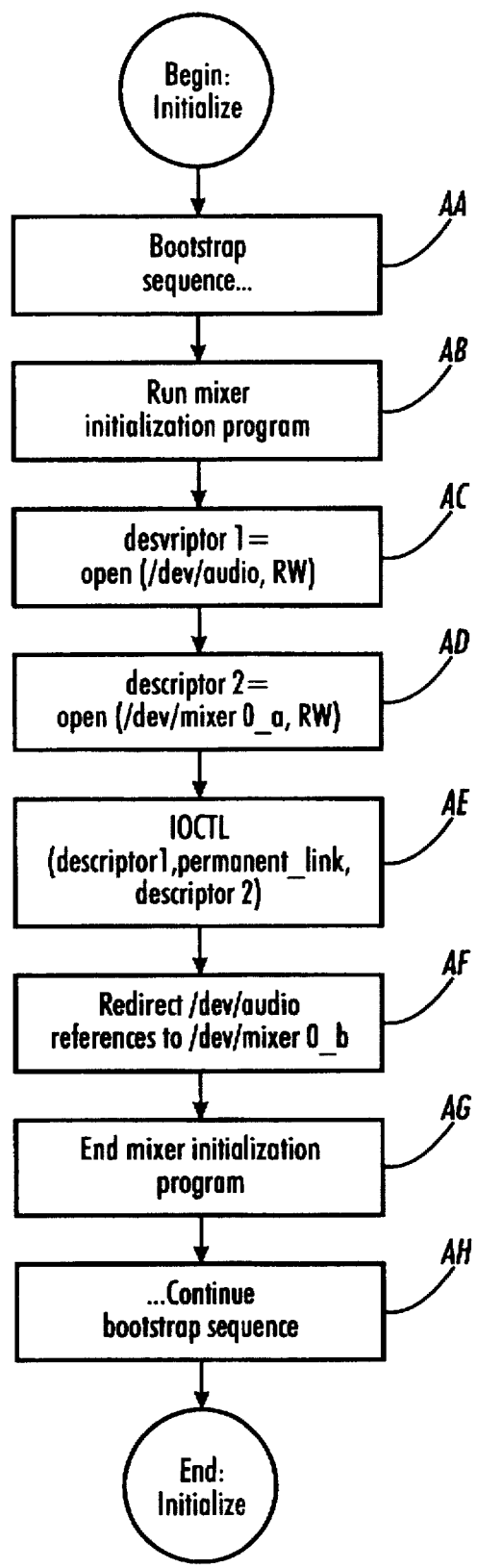
FIG. 5 is a flowchart showing how an initialization program can be used to set up a mixer for shared audio.

The flowchart of FIG. 5 shows how an initialization program can establish the link between /dev/mixer0_a and /dev/audio and the redirection of legacy audio program references to /dev/audio as discussed previously with reference to FIGS. 4A–4B. The initialization program is part of a larger system initialization or bootstrap sequence (Step AA), which can take place when system 100 is powered up or reset. The program runs (Step AB) as a task in user space 302. The program opens the logical device /dev/audio for reading and writing by invoking an appropriate procedure of operating system 150, and stores in a variable descriptor1 the file descriptor returned by the invoked procedure (Step AC). The program also opens the logical device /dev/mixer0_a for reading and writing by invoking an appropriate procedure of operating system 150, and stores in a variable descriptor2 the file descriptor returned by the invoked procedure (Step AD). Thereafter, the program invokes another procedure of operating system 150, such as the UNIX ioctl procedure, to establish a permanent link between the two devices whose file descriptors were stored, respectively, in the variables descriptor1 and descriptor2 (Step AE). Once the permanent link is established, the program removes the /dev/audio entry from the file system and replaces it with a new /dev/audio entry that has the same 16-bit logical device identifier as /dev/mixer0_b (device identifier (125,1) in this embodiment), thereby causing subsequent references to the logical device /dev/audio to be redirected automatically to the logical device /dev/mixer0_b (Step AF). This automatic redirection means that legacy audio programs will be automatically connected with side B 404 of mixer pair 0 (that is, mixer pair 400) whenever they attempt to access /dev/audio. Thereafter, the initialization program terminates (Step AG) and the remainder of the system initialization sequence can proceed to completion (Step AH).

Cascaded Mixer Pairs

Figure 6:
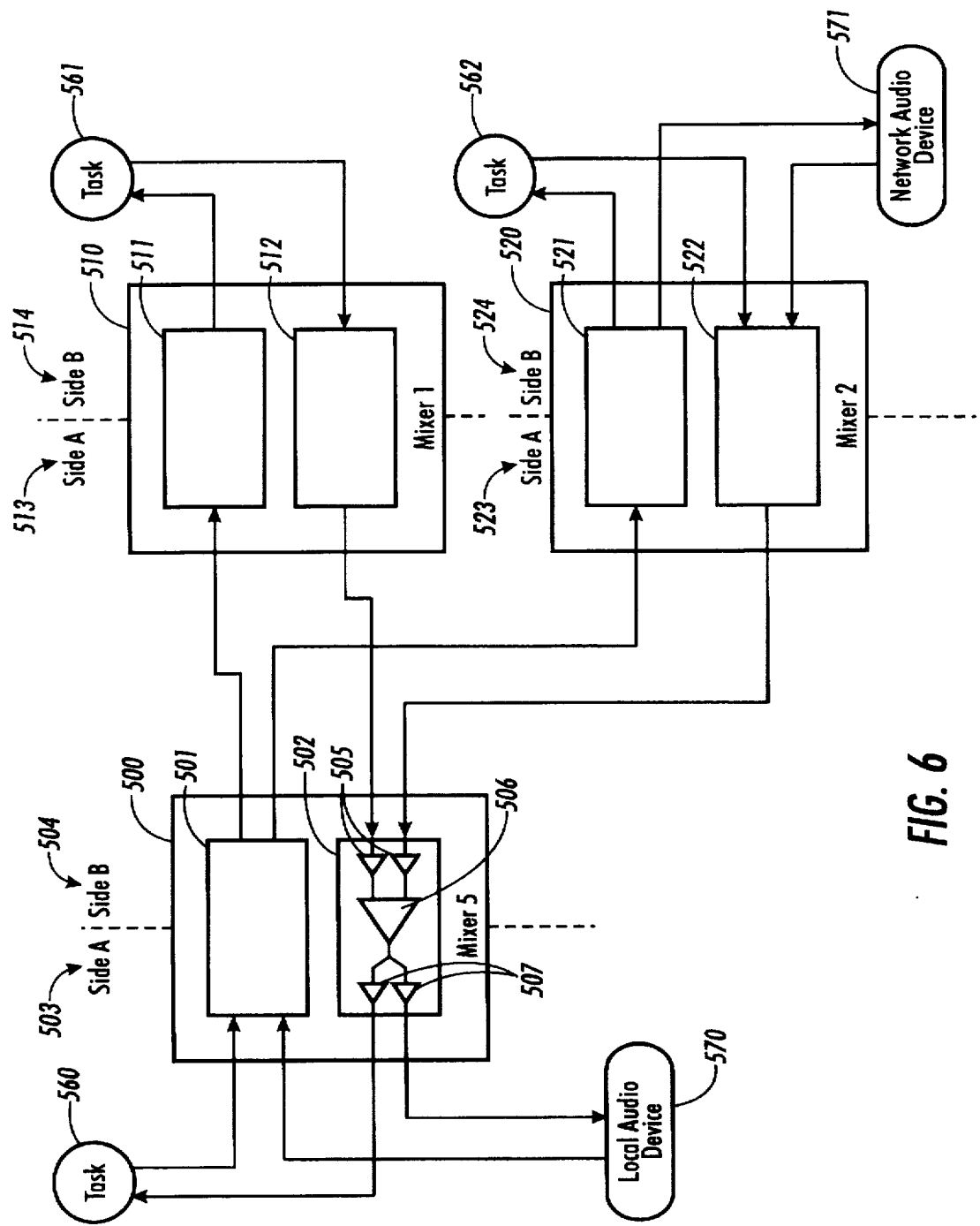
FIG. 6 illustrates an example of a set of multiple mixer pairs and routing of audio streams among them, including cascaded mixers.

Two or more mixer pairs of system 100 can be connected to one another. FIG. 6 illustrates an example of this. Mixer pair 500 is taken to be mixer pair 5 of system 100, mixer pair 510 is taken to be mixer pair 1, and mixer pair 520 is taken to be mixer pair 2. Mixer pair 500 includes mixers 501 and 502. Mixer 502 has been shown here in some detail, for ease of comparison with FIG. 2; in particular, input gain controls 505, adder 506, and output gain controls 507 are shown. (It will be understood that although not all of the mixers shown in FIG. 5 and elsewhere are illustrated with input gain controls, adders, and output gain controls, these elements are nevertheless present in the mixers, as previously described with reference to FIG. 2.) Mixer pair 510 includes mixers 511 and 512, and mixer pair 520 includes mixers 521 and 522.

Mixer pair 500 has side A 503 and side B 504. Task 560 connects with mixer pair 500 through a tap located on side A 503. A local audio device 570, which can be, for example, /dev/audio, connects with mixer pair 500 through another tap on side A 503. Mixer pair 500 is connected directly to mixer pair 510 and to mixer pair 520 through two more taps, which are located on side B 504.

Mixer pair 510 has side A 513 and side B 514. It is connected to mixer pair 500 through a tap on side A 513. Task 561 connects with mixer pair 510 through a tap on side B 514.

Mixer pair 520 has side A 523 and side B 524. It is connected to mixer pair 500 through a tap on side A 523. Task 562 connects with mixer pair 520 through a tap on side B 523. A network audio device 571, which can be, for example, the logical device that represents network interface 120, connects with mixer pair 520 through another tap on side B 523.

As previously described with reference to FIG. 3 and elsewhere, mixer pairs connect with one another and with hardware through taps located in kernel space 301. Tasks connect with mixer pairs through taps located in user space 302. Thus the connection between mixer pairs 500 and 510, the connection between mixer pairs 500 and 520, the connection between mixer pair 500 and local audio device 570, and the connection between mixer pair 520 and network audio device 571 are all in kernel space 301. The connection between mixer pair 500 and task 560, the connection between mixer pair 510 and task 561, and the connection between mixer pair 520 and task 562 are all in user space 302.

A task can connect with any mixer pair and can select the side of the mixer pair (side A or B) with which to connect by accessing the appropriate logical device. For example, because mixer pair 500 is taken to be mixer pair 5, it is represented by the logical devices /dev/mixer5_a, /dev/mixer5_b, /dev/mixer5_a_ctl, and /dev/mixer5_b_ctl. Thus, task 560 can connect with side A 503 of mixer pair 500 as shown in FIG. 6 by opening logical device /dev/mixer5_a. Local audio device 570 can be linked to side A 503 of mixer pair 500 as shown by performing a task that invokes operating system procedures to open /dev/mixer5_a, open local audio device 570, and establish a permanent link between these devices, in a manner analogous to that described above with reference to FIG. 5 for establishing a permanent link between /dev/mixer0_a and /dev/audio. As another example, task 561 can connect with side B 513 of mixer pair 510, which is taken to be mixer pair 1, by opening logical device /dev/mixer1_b. As yet another example, mixer pair 500 can be linked with mixer pair 520 by performing a task that invokes operating system procedures to open /dev/mixer5_b, open /dev/mixer2_a, and establish a permanent link between these devices, in a manner analogous to that described above with reference to FIG. 5 for establishing a permanent link between /dev/mixer0_a and /dev/audio.

Mixing and Queue Servicing Software

Kernel 151 includes software to implement the audio data processing and associated queue management for the eight mixer pairs of system 100. Each mixer pair can run independently of the other mixer pairs, and operating system 150 can schedule the processing required for each mixer pair independently of that required for the others.

A task, a hardware audio input device, or another mixer pair can enqueue data in the input queue of a mixer pair's tap at any time. A task does so by writing to the appropriate logical device representing the mixer pair. This can happen at any time during execution of the task. A hardware device does so by generating a device interrupt or other equivalent hardware or software interrupt that is sent to processor 105. The interrupt causes subsequent execution of an interrupt service procedure of operating system 150. Depending on the nature and timing of the interrupt, the interrupt service procedure can be executed immediately or scheduled for execution at a later time. For example, samples received from ADC 133 can be enqueued immediately, buffered in a temporary input buffer and then enqueued when the temporary buffer fills, or buffered in a hardware buffer and then enqueued by direct memory access (DMA) hardware associated with ADC 133, depending on the particular embodiment of the invention. Whatever buffering scheme is used, eventually processor 105 executes an interrupt service procedure of operating system 150 that causes one or more samples originating from ADC 133 to be delivered to the mixer pair via the tap to which the logical audio device representing ADC 133 is linked and to be enqueued in that tap's input queue.

Another mixer pair can enqueue data in the input queue of a mixer pair's tap if there is a link between the two mixer pairs. Once such a link has been established, the mixer pair doing the enqueuing simply writes the data to its own output queue, just as it would do if it were supplying data to DAC 130 or to another hardware device. Because the mixer pairs are linked, the output queue is the same as the input queue of the receiving mixer pair's tap; that is, the linked mixer pairs share a common queue between them.

A task, a hardware audio output device, or another mixer pair can dequeue data from the output queue of a mixer pair's tap at any time. In particular, the act of the mixer pair's outputting data can cause the intended recipient of that data to dequeue the data. For example, when a mixer pair outputs data to a task that has been temporarily suspended pending the arrival of new data, operating system 150 (and, more particularly, kernel 151) can cause the task to resume so that the task has an opportunity to dequeue some portion of the data. A task dequeues data by reading from the appropriate logical device representing the mixer pair. As another example, when a mixer pair outputs data to a hardware device or to another mixer pair, operating system 150 can schedule the execution of appropriate procedures for servicing, respectively, the hardware device or mixer pair.

In sum, the enqueuing of samples and markers to be input to a mixer pair and the dequeuing of samples output from a mixer pair is done as needed by the tasks, hardware, and other mixer pairs that are connected to the mixer pair in question.

The actual mixing of digital audio sample streams, and the attendant queue management functions—the dequeuing of samples and markers from input queues, and the enqueuing of samples of mixed output into output queues—are performed by mixer software in kernel 151 as will now be described with reference to FIGS. 7A–7C. FIG. 7A is a flowchart for a procedure, hereinafter called Domix, that services queues and performs mixing for both sides of a mixer pair.

Processor 105 can execute Domix in either of two circumstances. First, Domix is invoked whenever an input queue transitions from being empty to being nonempty, that is, from being empty to containing at least one sample or marker. Second, as will be explained more fully below with reference to FIG. 7A, Domix can be scheduled to run in response to an interrupt received by processor 105 from timer 109. In this embodiment, timer 109 issues a periodic interrupt to processor 105 every 10 milliseconds. Operating system 150 provides a facility, hereinafter called timeout, that can be invoked to schedule the execution of a named software procedure at a particular time in the future as measured in interrupts from timer 109. For example, Domix can schedule itself to run again at the next timer 109 interrupt or after a specified number of interrupts has occurred.

When processing real-time audio it is desirable that a digital audio processing system, such as system 100, respond to the introduction of new inputs and to changes in inputs and in control values sufficiently rapidly that a human listener does not perceive an objectionably long delay between the arrival of a new or changed input and the system's response to that input. For example, in the arrangement of FIGS. 4A–4B, if a user begins to speak into microphone 134, it is desirable that the sound of the user's voice be heard as a contribution to the output at speaker 131 without undue delay. In general, this goal is achieved if the system's response time is on the order of 30 milliseconds or less. In particular, a response time of 30 milliseconds or less ensures that in real-time conversation between users of two such systems connected remotely to one another (as by network 125), the overall delay between the arrival of an utterance of the first user at the microphone of the first system and the playback of that utterance at the speaker of the second system is on the order of no more than 60 milliseconds plus transmission delays.

To ensure that system 100 responds to new or changed inputs within 30 milliseconds, it is preferable for processor 105 to execute Domix at least every 10 milliseconds, or in other words at least once for every interrupt received from timer 109. Input and output queue length parameters are set accordingly; for example, input and output queues can be set to hold a maximum of 30 milliseconds' worth of samples without overflowing, and output queues can be set to hold a minimum of 15 milliseconds' worth of samples without being considered almost empty (see below with reference to Step CE in FIG. 7A, Step DF in FIG. 7B, and step EA in FIG. 7C). In situations where real-time responsiveness is not required, as when mixing two or more previously recorded sounds without listening to the mixed output through speaker 131 during the mixing, longer queues and less frequent calls to Domix can be used.

Figure 7A:
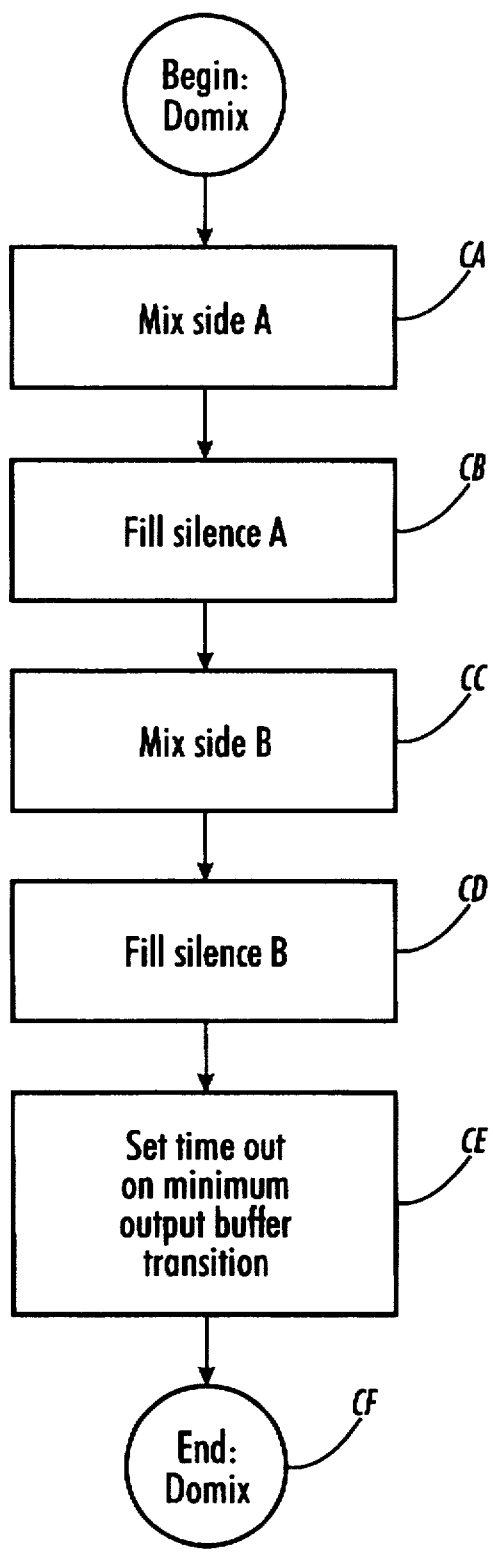
FIGS. 7A–C is a set of flowcharts showing the logic of software procedures used in servicing the mixer queues and doing the mixing.

The flowchart of FIG. 7A shows the high-level steps of Domix. Inputs to side A of the mixer pair are mixed, with attendant queue management (Step CA). Optional silence filling is performed for side A (Step CB). Inputs to side B of the mixer pair are mixed, with attendant queue management (Step CC). Optional silence filling is performed for side B (Step CD). Finally, Domix calls timeout to schedule the next execution of Domix at a subsequent interrupt from timer 109 (Step CE). Domix is scheduled to execute whenever the output queues on either side of the mixer pair (that is, on either side A or side B) will next become almost empty. Thereafter, Domix terminates (Step CF).

Figure 7B:
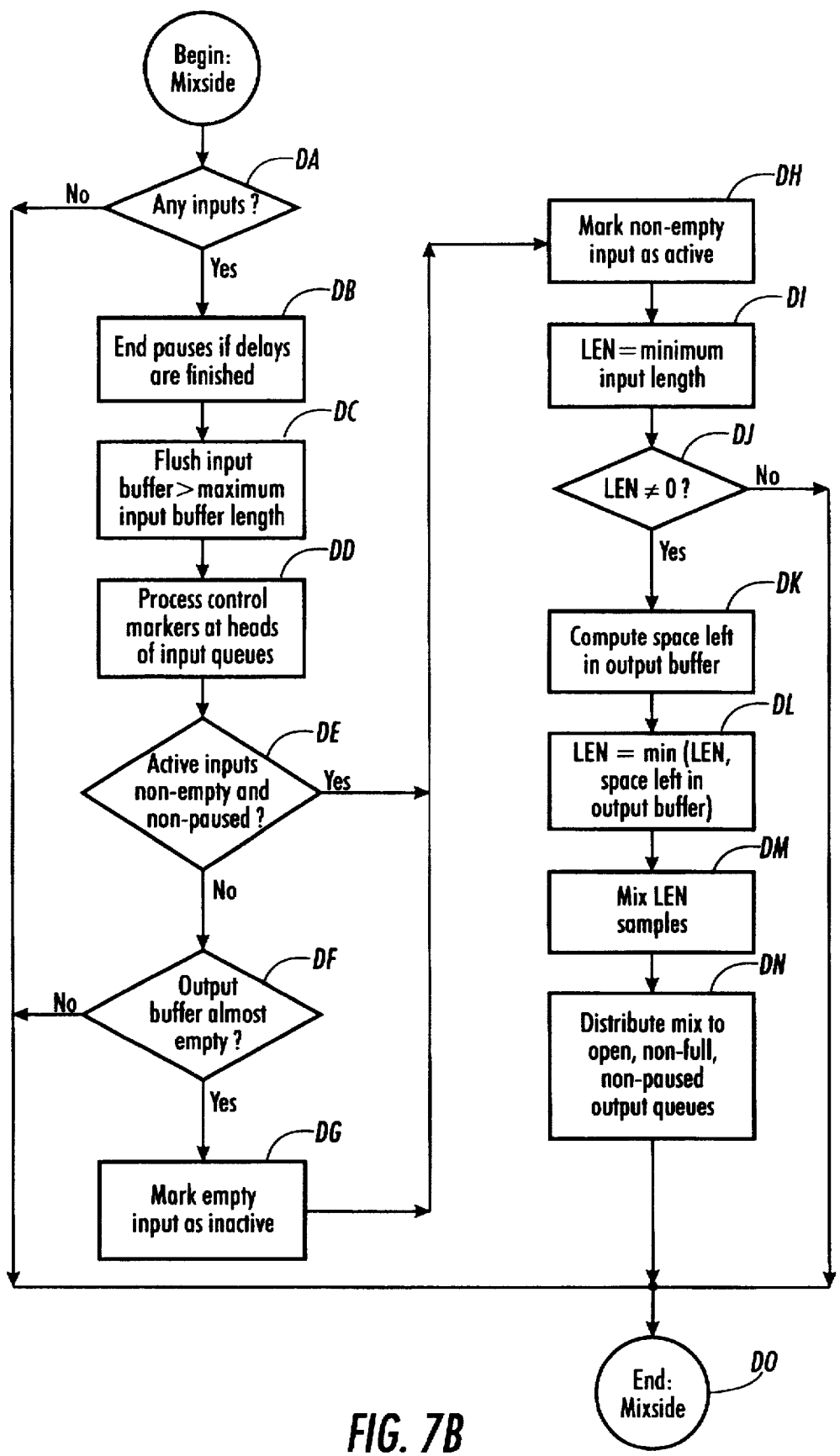

The flowchart of FIG. 7B shows in more detail the steps for a procedure, hereinafter called Mixside, that mixes the inputs from one side of the mixer pair (either side A as in step CA of FIG. 7A or side B as in step CC of FIG. 7A). Mixside first determines whether there are any inputs to this side of the mixer pair, that is, whether any of the input queues associated with taps located on this side of the mixer pair contains any data (Step DA). If not, there is nothing further to do for this side of the mixer pair, and Mixside terminates (Step DO). If there are inputs to this side of the mixer pair, then Mixside determines whether to resume the processing of any of the input queues on this side that may previously have been suspended in response to control markers indicating delays, and if so, causes processing for these input queues to resume (Step DB). Next, if any input queues on this side contain more data than a preset maximum limit (that is, if any input queues are overflowing), Mixside discards the data in these queues (Step DC).

Next, Mixside determines whether markers are present at the heads of any of the input queues for this side and, if so, processes these markers (Step DD). A marker indicates that some special processing, such as a delay (a suspension of audio sample processing for a specified number of milliseconds or until a specified time), is required for the input queue in which the marker appears.

Once markers have been processed, Mixside determines whether there are any active input queues on this side, that is, any input queues that are not empty and for which processing is not currently suspended (i.e., delayed or paused) (Step DE). If so, processing continues at step DH; otherwise, Mixside determines whether the output buffer for this side is almost empty, that is, whether the output buffer contains fewer milliseconds' worth of audio samples than a predetermined minimum (Step DF).

The output buffer is a temporary data structure in which Mixside stores output samples prior to scaling them by the output gains. The output buffer's contents are not preserved between calls to Mixside; instead, Mixside keeps track of how long the output buffer should be, and allocates space for it in memory 106 as needed. More particularly, for each side of the mixer pair, Mixside maintains a clock (a variable in memory 106) that represents the time at which all already-mixed samples will be exhausted from the output queues, assuming that the output queues are emptied at the sample rate in real time. For example, if the sample rate is 8 kHz, and 80 samples are mixed, this is considered to be 10 milliseconds' worth of samples for purposes of updating the clock, regardless of whether particular output queues are being emptied at faster-than-real-time or slower-than-real-time rates, that is, at rates other than 8 kHz. Mixside updates the clock as new samples are mixed and output. To determine the amount of space available in the output buffer, Mixside subtracts the clock time from the current time (obtained from the system clock of operating system 150), subtracts this difference from the maximum output queue length expressed in terms of time (e.g., 30 milliseconds), and converts the result from time to samples. To determine whether the output buffer is almost empty, Mixside subtracts the clock time from the current time and compares the difference with the predetermined minimum output queue length expressed in terms of time (e.g., 15 milliseconds); when the difference is less than the predetermined minimum, the output buffer is considered to be almost empty.

Continuing in FIG. 7B, if the output buffer is not almost empty, there is nothing further to do for this side of the mixer pair, and Mixside terminates (Step DO). If the output buffer is almost empty, Mixside checks whether any active input queues are empty, that is, contain no data, and marks all such queues as inactive (Step DG). Thereafter, processing continues at step DH.

Mixside next determines which of the input queues on this side of the mixer pair are not empty and not suspended, and marks these queues as active (Step DH). Then, for each of these active input queues, Mixside computes the length, that is, the number of milliseconds' worth of audio samples in each queue, and determines the minimum among these lengths, which is stored in a variable LEN (Step DI). If the value of LEN is zero (Step DJ), there is nothing further to do for this side of the mixer pair, and Mixside terminates (Step DO). If the value of LEN is nonzero, Mixside determines the amount of space available in the output buffer on the opposite side of the mixer pair (Step DK).

Once the amount of space available in the output buffer is known, Mixside resets LEN to the minimum of its previous value and the amount of space available in the output buffer (Step DL), and then dequeues and mixes LEN samples from the active input queues on this side of the mixer pair (Step DM). In other words, Mixside mixes as many samples as the shortest active input queue contains or as many as the output buffer will hold, whichever is smaller. Mixing is performed by combining corresponding input samples from all active input queues to form an output sample. In particular, Mixside scales (multiplies) the input samples from the various active input queues by their respective input gains (as determined by the control information for the mixer pair), adds the scaled inputs together to form a resultant sum, clips or otherwise limits the sum so that it does not exceed a maximum amplitude, and stores the resulting mixed output as a sample in the output buffer. Mixside also updates the clock for this side of the mixer pair, so that subsequent output buffer length computations will be correctly performed, and computes average signal levels for the scaled inputs, using a running-average technique analogous to the technique (to be described shortly) used for computing average output signal levels.

Thereafter, Mixside scales the samples in the output buffer according to the output gain for each non-full, non-suspended output queue on the opposite side of the mixer pair, and stores the scaled results in the output queues (Step DN). If an output queue is full (for example, because it is being emptied at a slower-than-real-time rate) or suspended (for example, because a user task has made a call to ioctl indicating that processing of the output queue should be paused), Mixside skips that output queue and effectively discards its scaled results until the queue becomes non-full or non-suspended.

As it provides the scaled results to the output queues (in Step DN), Mixside computes and stores in memory 106 a running average of the magnitude of the samples being added to each output queue. The computed averages, which serve to measure the average signal level associated with each output stream, are provided by the mixer pair as control outputs. To compute the running average for each queue, Mixside computes the average magnitude of the newly enqueued output samples, and computes a weighted average of this result with the previously stored running average for queue. The weighting factor is determined by a control parameter that indicates a time interval or window over which averaging is to be done. For example, if the averaging interval is 1000 samples, and 100 samples are newly enqueued, then the weighting of the average magnitude of the new samples is 0.1 (100 samples divided by 1000 samples), and the weighting of the previously stored running average is 0.9 (900 samples divided by 1000 samples). The control parameter for the averaging time interval can be adjusted through the control inputs of the mixer pair.

There are several considerations to be taken into account in implementing the various mixing and scaling operations of Mixside. Preferably, sufficient mathematical precision should be maintained in all mixing and scaling operations to minimize the introduction of errors (noise) into the output samples. Preferably, too, sufficient computational efficiency should be maintained to ensure adequate (e.g., real-time) performance. Persons of skill in the art will appreciate that tradeoffs can be made between precision and efficiency. Finally, when the audio samples input to and output from a mixer pair are encoded in a mu-law or other nonlinear representation, the software for scaling and adding samples must take account of the encoding scheme. For example, to add samples that are encoded in an 8-bit mu-law representation, each sample can be converted to a 13-bit linear integer value, the values added, the result clipped, and the clipped result reconverted to 8-bit mu-law representation. To scale a sample encoded in a mu-law representation, the sample can be added to a mu-law encoded scale factor. This works, albeit with some possible loss of precision, because the mu-law encoding is essentially an exponential representation, so that the addition of exponents corresponds to a multiplication of underlying quantities.

In this embodiment, to promote computational efficiency, the results of adding and clipping all possible combinations of two 8-bit mu-law samples are precomputed at system initialization and stored in a look-up table in memory 106.

This table, which is recomputed any time the encoding scheme is changed, can be used to add samples encoded in mu-law representation. Two mu-law samples can be added to produce a mu-law result, properly clipped, with a single table look-up operation. Three or more mu-law samples can be added by performing repeated table look-ups on partial sums; for example, three samples can be added by adding the first two samples with a first table look-up to obtain a partial result, and then adding the third sample to this partial result with a second table look-up. This procedure for adding three or more mu-law samples provides computational efficiency at the expense of some possible loss of precision, in that partial sums are converted back and forth between mu-law and linear representations. In other embodiments, different implementation schemes for mixing and scaling can be used. For example, tables for converting between mu-law and linear representations and vice versa can be precomputed, enabling all sample additions to be performed using linear representations.

Figure 7C:
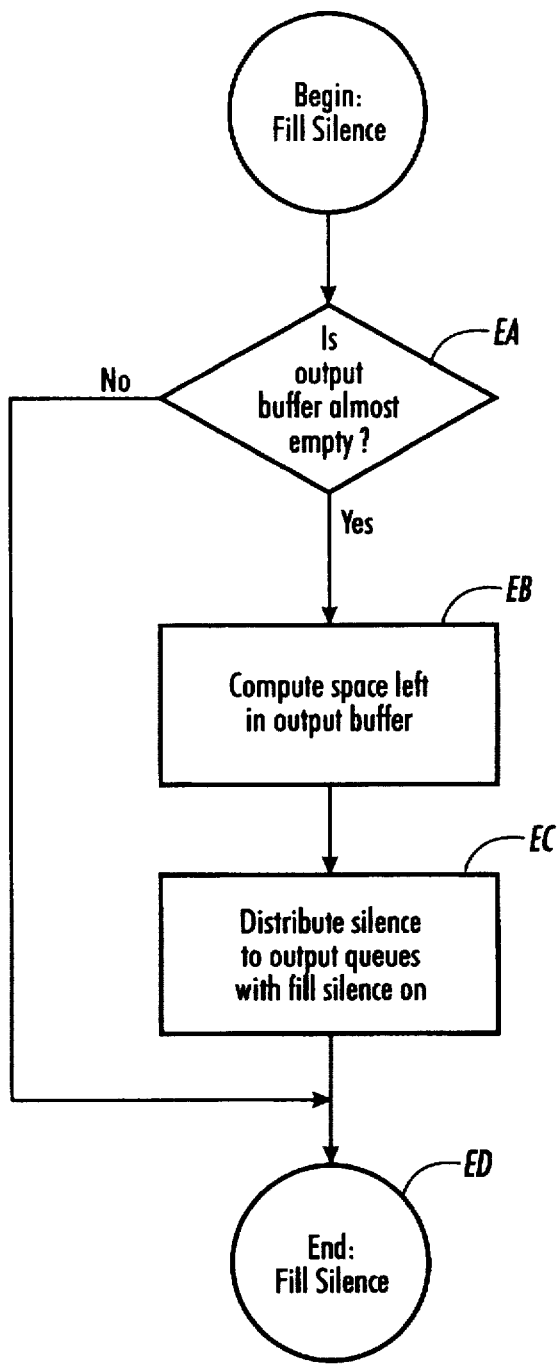

The flowchart of FIG. 7C shows in more detail the steps of a procedure, hereinafter called Fill Silence, for performing silence filling for one side of the mixer pair (either side A as in step CB of FIG. 7A or side B as in step CD of FIG. 7A). Silence filling inserts zero-amplitude samples into a stream of output audio samples on the opposite side of the mixer pair in order to represent a period of silence in the output audio signal associated with a particular output queue. This stands in contrast to the behavior of the mixer pair with regard to output queues for which silence filling is not active. For those queues, the mixer pair simply ceases to provide an output stream.

Silence filling is optional. In this embodiment, silence filling is ordinarily active. Silence filling can be activated or deactivated for a particular output queue by providing appropriate control information to a mixer pair. Also, the default value for whether to fill silence for a newly opened tap can be modified by providing appropriate control information to the mixer pair. Preferably, silence filling is activated for output queues associated with nonreal-time audio processing, and deactivated for output queues associated with real-time audio processing so as to avoid introducing unnecessary processing delays. In particular, when /dev/audio is shared among tasks according to the arrangement of FIGS. 4A–4B, silence filling is deactivated for the output queue that supplies mixed audio output to speaker 131 via DAC 130.

Silence filling can be used to maintain timing consistency of the mixed audio stream produced by a mixer pair when subsequent processing of that mixed audio stream does not take place in real time. For example, in the arrangement of FIG. 4B, suppose that an input stream from task 462 to side B 404 of mixer pair 400 contains one minute of audible sound followed by two minutes of silence, and that an input stream from task 463 to side B 404 of mixer pair 400 contains two minutes of silence followed by one minute of audible sound. Suppose further that the mixed output from side A 403 of mixer pair 400 is heard in real time at speaker 131 and also is stored to a data buffer by task 460. If silence filling is deactivated for the relevant output queues of mixer pair 400 (that is, for output queues 480 and 491), speaker 131 will play one minute of audible sound, followed by one minute of silence, followed by one minute of audible sound, which is the desired output. However, task 460, which receives no samples corresponding to the one minute of silence, will (incorrectly) buffer the samples representing the second minute of audible sound immediately following those representing the first minute of audible sound with no space in between, thus effectively splicing out the period of silence that was present in the original input audio. By activating silence filling for output queue 480, the problem is solved. The silence is explicitly represented to task 460 as a stream of zero-amplitude samples, and so the post-silence samples maintain the correct temporal relationship to the pre-silence samples.

In FIG. 7C, Fill Silence begins by determining whether the output buffer for this side of the mixer pair is almost empty, that is, whether the output buffer contains fewer milliseconds' worth of audio samples than a predetermined minimum (Step EA). If not, there is nothing further to do and Fill Silence terminates (Step ED); otherwise, Fill Silence computes the available space left in the output buffer (Step EB) and supplies zero-amplitude samples to all active output queues for which silence filling is selected (Step EC). Thereafter, Fill Silence terminates (Step ED).

Whereas the audio data mixed according to the flowcharts of FIGS. 7A–7C is received in the mixer pair via taps, control information can be received either via taps or via control channels. In this embodiment, a task can change (write) and monitor (read) control information associated with a particular tap by invoking the ioctl procedure with appropriate arguments or, for some kinds of control information, by embedding appropriate markers in the audio data stream supplied to the tap. A task can change and monitor control information for any tap on a given side of a mixer pair, and also certain control information that pertains to the side of the mixer pair as a whole, by accessing the logical device that represents the control channel for that side of the mixer pair.

More specifically, to change or monitor a particular tap's input or output gain control values, its maximum input buffer length, or its silence-filling options, to immediately pause or unpause the tap's input or output data stream, or to monitor the tap's average audio signal levels and the number of samples transferred, a task can use these procedure calls:

ioctl(datafd, AUDIO_SETINFO, info)

ioctl(datafd, AUDIO_GETINFO, info)

In these procedure calls, the datafd arguments indicate which tap is being accessed. The AUDIO_SETINFO and AUDIO_GETINFO arguments indicate, respectively, that control information is to be changed or monitored, that is, written to or read from the tap. The info arguments represent data structures or sets of fields that indicate the particular control information to be changed or monitored.

To insert a delay marker into the input queue for a particular tap, a task can call ioctl(datafd, AUDIO_DELAY, time), which inserts a marker indicating a delay of a specified time interval, or ioctl(datafd, AUDIO_DELAYUNTIL, abstime), which inserts a marker indicating a delay that is to last until a particular absolute time. In either case, samples written to the tap after the call to ioctl are subject to the delay.

Delays can be used to synchronize input audio signals. For example, a task can mark a point in an input audio stream for play at a specified time by inserting an appropriate marker into the stream. Thus the input audio stream can arrive at the mixer pair ahead of schedule, without beginning to contribute to the mixed output until the specified time is reached. In this way, two or more tasks' audio streams can be coordinated.

To insert an end-of-block marker into the input queue for a particular tap, a task can call the procedure write just as it normally would when writing a series of audio samples, but specifying that the number of samples to be written is zero. The mixer pair interprets this as a signal to insert an end-of-block marker into the input queue. When the mixer pair encounters the end-of-block marker in the queue, the mixer pair signals the task that the marker has been reached.

To access the control information via a control channel, a task can use these procedure calls for control information associated with a particular tap:

ioctl(mixctlfd, MIXER_SETCHANINFO, chaninfo)
ioctl(mixctlfd, MIXER_GETCHANINFO, chaninfo)

These procedure calls correspond, respectively, to the ioctl(datafd, AUDIO_SETINFO, info) and ioctl(datafd, AUDIO_GETINFO, info) calls discussed previously. A task can call ioctl(mixctlfd, MIXER_SETCHANINFO, chaninfo) to change the same kinds of control information that can be changed with a call to ioctl(datafd, AUDIO_SETINFO, info), and can call ioctl(mixctlfd, MIXER_GETCHANINFO, chaninfo) to monitor the same kinds of control information that can be monitored with a call to ioctl(datafd, AUDIO_GETINFO, info). The mixctlfd arguments indicate which control channel is being accessed. The chaninfo arguments include the information present in the info arguments discussed previously and, additionally, specify which tap is being changed or monitored. Further, the chaninfo arguments include fields that allow the task to determine which side of a mixer pair a given tap is on.

To access control information that is associated with an entire side of a mixer pair rather than with any particular tap, such as the minimum and maximum output buffer size, the time interval over which average audio signal levels are calculated, the default maximum input buffer size for newly opened taps, and the default for whether to activate silence filling on newly opened taps, a task can use these procedure calls:

ioctl(mixctlfd, MIXER_SETINFO, mixerinfo)
ioctl(mixctlfd, MIXER_GETINFO, mixerinfo)

In these procedure calls, the mixctlfd arguments indicate which control channel is being accessed. The MIXER_SETINFO and MIXER_GETINFO arguments indicate, respectively, that control information is being changed (written) or monitored (read). The mixerinfo arguments represent data structures or sets of fields that indicate the particular control information to be changed or monitored.

Conclusion

The foregoing specific embodiment represents just some of the possibilities for practicing the present invention. Many other embodiments are possible within the spirit of the invention. For example, in some embodiments, a specialized "mixing console" application can be used to provide a convenient mechanism by which a user can control and monitor the mixers. Such a task can, for example, employ user interface hardware 107 to provide a graphical user interface by which to monitor average audio signal levels computed during mixing and to monitor and adjust the gain control values of the various mixer pairs of system 100. As another example, the control inputs and outputs of the mixer, which are available for connection to a task in user space in the specific embodiment described earlier, can also be linked to hardware in other embodiments. Thus a value obtained from a physical input, such as a potentiometer coupled to a digitizer and sample-and-hold circuitry optionally incorporated as part of user interface hardware, can be used to control the input or output gain of a mixer via a control input. A bank of such potentiometers, as commonly found in an audio mixing console, can be used in some embodiments. Moreover, average audio signal levels computed during mixing can be provided to dedicated display hardware, such as a bank of level meters. Control channels in kernel space, corresponding to those in user space, can be provided for side A and side B of a mixer pair. As yet another example, the invention can be implemented in a system that supports stereo audio inputs and outputs or in a system that supports multiple ADCs and DACs running contemporaneously at different samples rates. As still another example, the mixer software can be enhanced to include additional audio processing capabilities, for example, silence detection, reverberation, white or other noise introduction, and filtering, and to include other additional capabilities, such as data encryption and decryption or data format conversions. Accordingly, the scope of the invention is not limited to the foregoing specification, but instead is given by the appended claims together with their full range of equivalents.

I claim:

1. In a computer system having a processor, a method comprising the steps of:

executing a multitasking operating system with the processor, the operating system having a kernel comprising kernel software;

executing a first task with the processor under control of the operating system;

while executing the first task, executing a second task with the processor under control of the operating system;

providing a first audio stream comprising a first series of digital audio samples representing a first audio signal, the first audio stream being affiliated with the first task;

while providing the first audio stream, providing a second audio stream comprising a second series of digital audio samples representing a second audio signal, the second audio stream being affiliated with the second task; and by executing a portion of the kernel software with the processor, mixing the first and second audio streams to provide a mixed audio stream comprising a series of digital audio samples representing a superposition of the first and second audio signals.

2. The method of claim 1 further comprising the step of receiving a series of timing signals in the processor, and in which the mixing step is performed in response to received timing signals of the series.

3. The method of claim 1 in which the computer system further comprises an output device, and further comprising the step of coupling the mixed audio stream to the output device.

4. The method of claim 3 in which the output device comprises a digital-to-analog converter (DAC) and the coupling step comprises converting digital samples of the mixed audio stream to an analog signal with the digital-to-analog converter.

5. The method of claim 3 in which the output device comprises a data storage device and in which the coupling step comprises writing digital samples of the mixed audio stream as data to the data storage device.

6. The method of claim 3 in which the output device comprises a network and in which the coupling step comprises transmitting digital samples of the mixed audio stream across the network.

7. The method of claim 1 in which the computer system further comprises an input device, and further comprising the step of producing the first audio stream with the input device.

8. The method of claim 7 in which the input device comprises an analog-to-digital converter (ADC) and the producing step comprises converting an analog signal to the digital samples of the first audio stream with the analog-to-digital converter.

9. The method of claim 7 in which the input device comprises a data storage device and in which the producing step comprises reading digital samples of the first audio stream as data from the data storage device.

10. The method of claim 7 in which the input device comprises a network and in which the producing step comprises receiving digital samples of the first audio stream from across the network.

11. The method of claim 1 in which the computer system further comprises memory coupled to the processor, and further comprising the steps of:

establishing in the memory a first input queue;

establishing in the memory a second input queue;

by executing a portion of the kernel software with the processor, placing digital samples of the first audio stream into the first input queue; and by executing a portion of the kernel software with the processor, placing digital samples of the second audio stream into the second input queue;

and in which the mixing step comprises retrieving samples of the first audio stream from the first input queue and retrieving samples of the second audio stream from the second input queue.

12. The method of claim 1 in which the computer system further comprises memory coupled to the processor, and further comprising the step of establishing in the memory an output queue, and in which the mixing step comprises placing samples of the mixed audio stream into the output queue.

13. In a computer system having a processor, a method comprising the steps of:

executing a multitasking operating system with the processor, the operating system having a kernel comprising kernel software, the operating system providing a audio device supporting a single audio stream;

executing a first task with the processor under control of the operating system;

while executing the first task, executing a second task with the processor under control of the operating system;

with the processor, requesting access from the first task to the audio device, the access requested from the first task being of a first access type;

with the processor, requesting access from the second task to the audio device, the access requested from the second task being of a second access type, the second access type including the first access type; and by executing a portion of the kernel software with the processor, coupling the single audio stream of the audio device contemporaneously to the first and second tasks, the single audio stream being coupled to the first task according to the first access type, the single audio stream being coupled to the second task according to the second access type.

14. The method of claim 13 in which the first access type includes write access, and further comprising the steps of producing a first audio stream with the first task, and producing a second audio stream with the second task;

and in which the coupling step comprises mixing the first and second audio streams together to produce the single audio stream supported by the audio device.

15. The method of claim 13 in which the first access type includes read access and the coupling step comprises routing an input stream from the audio device to the first task and to the second task.

16. The method of claim 13 in which the operating system provides a mixing capability including a mixer, in which the first task is affiliated with a first audio stream and the second task is affiliated with a second audio stream, and in which the coupling step comprises:

coupling the single audio stream to the first audio stream via the mixer; and coupling the single audio stream to the second audio stream via the mixer.

17. In a computer system having a processor, a method comprising the steps of:

executing a multitasking operating system with the processor, the operating system having a kernel, the kernel comprising kernel software, the kernel providing a mixing capability for mixing a plurality of component audio streams into a mixed audio stream, each of the component audio streams comprising a series of digital audio samples representing a component audio signal, the mixed audio stream comprising a series of digital audio samples representing a superposition of the component audio signals;

executing a task with the processor under control of the operating system, the task being affiliated with an audio stream comprising a series of digital audio samples representing an audio signal capable of being used as a component audio signal of the superposition;

establishing a connection between the audio stream affiliated with the task and the mixing capability of the kernel by designating the audio stream affiliated with the task as a component audio stream to be mixed into the mixed audio stream, the audio signal represented by the sample series of the audio stream so designated thus being used as a component audio signal of the superposition;

with the connection between the audio stream affiliated with the task and the mixing capability of the kernel thus established, executing a portion of the kernel software with the processor to effect the mixing capability and thus to mix the audio stream affiliated with the task into the mixed audio stream; and with the audio stream affiliated with the task thus mixed into the mixed audio stream, providing the mixed audio stream as an output from the mixing capability.

18. The method of claim 17 and further comprising the steps of:

severing the connection between the audio stream affiliated with the task and the mixing capability of the kernel;

with the connection between the audio stream affiliated with the task and the mixing capability of the kernel thus severed, executing a portion of the kernel software with the processor to effect the mixing capability and thus to produce a mixed audio stream in which the audio stream affiliated with the task is not among the plurality of component audio streams; and with the audio stream affiliated with the task thus not among the plurality of component audio streams of the mixed audio stream, providing the mixed audio stream as an output from the mixing capability.

19. The method of claim 17 in which the mixed audio stream has an overall amplitude, each component audio stream has a relative amplitude with respect to the overall amplitude, and the mixing capability includes a plurality of level controls to adjust amplitudes of the component audio streams relative to the overall amplitude, and further comprising the steps of:

with the connection between the audio stream affiliated with the task and the mixing capability of the kernel established, adjusting a level control to change the relative amplitude of the audio stream affiliated with the task from a first amplitude to a second amplitude;

with the level control thus adjusted, executing a portion of the kernel software with the processor to effect the mixing capability and thus to produce a mixed audio stream in which the relative amplitude of the audio stream affiliated with the task is changed to the second amplitude; and with the relative amplitude of the audio stream affiliated with the task thus changed to the second amplitude, providing the mixed audio stream as an output from the mixing capability.

20. The method of claim 17 in which the mixing capability includes a plurality of output routings, each output routing having an associated level control, and in which the step of providing the mixed audio stream as an output from the mixing capability comprises the steps of:

routing the mixed audio stream through an output routing to provide a routed output stream having an amplitude; and changing the amplitude of the routed output stream by adjusting the level control associated with the output routing through which the mixed audio stream has been thus routed.

21. Apparatus comprising:

a computer system having a processor;

a multitasking operating system executed with the processor, the operating system having a kernel, the kernel comprising kernel software;

a plurality of tasks comprising application software programs executed contemporaneously with the processor under control of the operating system, each task being affiliated with an audio stream comprising a series of digital audio samples representing an audio signal; and mixer means, comprising a portion of the kernel software executed with the processor, providing a mixing capability for mixing the audio streams affiliated with the tasks to provide a mixed audio stream comprising a series of digital audio samples representing a superposition of audio signals, the superposition having a plurality of components, each component being an audio signal represented by the sample series of an audio stream with which a task is affiliated.

22. The apparatus of claim 21 and further comprising an output device for receiving the mixed audio stream.

23. The apparatus of claim 22 in which the output device includes a digital-to-analog converter (DAC).

24. The apparatus of claim 21 and further comprising an input device for providing an audio stream, the audio stream thus provided being an audio stream affiliated with a task of the plurality of tasks.

25. The apparatus of claim 24 in which the input device includes an analog-to-digital converter (ADC).

26. The apparatus of claim 21 in which the computer system further comprises memory coupled to the processor, and further comprising:

a plurality of input queues, coupled to the mixer means, for enqueuing digital samples of the audio streams affiliated with the tasks prior to mixing, the input queues comprising memory;

an output queue, coupled to the mixer means, for enqueuing digital samples of the mixed audio stream subsequent to mixing, the output queue comprising memory; and queue control means, comprising a portion of the kernel software executed with the processor, to control the enqueuing of digital samples in the input queues and the output queue according to a control logic.

27. The apparatus of claim 21 in which the mixer means comprises:

a plurality of mixers, each mixer providing a mixing capability for mixing a subset of the audio streams affiliated with the tasks to provide a mixed audio stream comprising a series of digital audio samples representing a superposition of the audio signals represented by the sample series of the audio streams of the subset.

28. The apparatus of claim 27 in which the computer system further comprises memory coupled to the processor, and further comprising:

a plurality of input queues, coupled to the mixer means, for enqueuing digital samples of the audio streams affiliated with the tasks prior to mixing, the input queues comprising memory;

a plurality of output queues, coupled to the mixer means, each output queue being associated with a mixer, each output queue being a queue for enqueuing digital samples of the mixed audio stream provided by the mixer with which the output queue is associated subsequent to mixing by said mixer, the output queues comprising memory; and queue control means, comprising a portion of the kernel software executed with the processor, to control the enqueuing of digital samples in the input queues and the output queues according to a control logic.

* * * * *